United States Patent
Cen et al.

(10) Patent No.: US 11,711,410 B2
(45) Date of Patent: *Jul. 25, 2023

(54) SYSTEMS AND METHODS FOR ENCODING AND SHARING CONTENT BETWEEN DEVICES

(71) Applicant: DIVX, LLC, San Diego, CA (US)

(72) Inventors: Song Cen, San Diego, CA (US); Reza Emdad, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/804,501

(22) Filed: May 27, 2022

(65) Prior Publication Data

US 2022/0368749 A1 Nov. 17, 2022

Related U.S. Application Data

(63) Continuation of application No. 16/847,363, filed on Apr. 13, 2020, now Pat. No. 11,349,892, which is a
(Continued)

(51) Int. Cl.
*H04L 29/06* (2006.01)
*H04L 65/612* (2022.01)
(Continued)

(52) U.S. Cl.
CPC ............ *H04L 65/612* (2022.05); *H04L 63/08* (2013.01); *H04L 63/102* (2013.01);
(Continued)

(58) Field of Classification Search
None
See application file for complete search history.

(56) References Cited

U.S. PATENT DOCUMENTS 3,609,227 A 9/1971 Kuljian
4,694,491 A 9/1987 Horne et al.
(Continued)

FOREIGN PATENT DOCUMENTS

CA 2237293 A1 7/1997
CN 1551631 A 12/2004
(Continued)

OTHER PUBLICATIONS

Wu, Dajun et al. A scalable to lossless audio streaming system applicable to mobile devices. 2011 6th IEEE Conference on Industrial Electronics and Applications. https://ieeexplore.ieee.org/stamp/stamp.jsp?tp=&arnumber=5975666 (Year: 2011).*

(Continued)

*Primary Examiner* — Jeremiah L Avery
(74) *Attorney, Agent, or Firm* — KPPB LLP

(57) ABSTRACT

Systems and methods for sharing content between devices are disclosed. To request a shared piece of media content, a playback device generates and sends a request to content server. The playback device includes information in the request that indicates the playback capabilities of the device. The content server receives the request and determines the playback capabilities of the playback device from the information in the request. The content server then determines the assets that may be used by the playback device to obtain the media content and generates a top level index file for the playback device that includes information about the determined assets. The top level index file is then sent to the playback device that may then use the top level index file to obtain the media content using the indicated assets.

31 Claims, 8 Drawing Sheets

Related U.S. Application Data continuation of application No. 16/292,036, filed on Mar. 4, 2019, now Pat. No. 10,623,458, which is a continuation of application No. 14/989,551, filed on Jan. 6, 2016, now Pat. No. 10,225,298.

(60) Provisional application No. 62/100,299, filed on Jan. 6, 2015.

(51) Int. Cl.
*H04L 9/40* (2022.01)
*H04L 69/24* (2022.01)
*H04N 21/2343* (2011.01)
*H04N 21/254* (2011.01)
*H04N 21/2743* (2011.01)
*H04L 65/75* (2022.01)

(52) U.S. Cl.
CPC .......... *H04L 63/107* (2013.01); *H04L 65/762* (2022.05); *H04L 65/764* (2022.05); *H04L 69/24* (2013.01); *H04N 21/2343* (2013.01); *H04N 21/23439* (2013.01); *H04N 21/2541* (2013.01); *H04N 21/2743* (2013.01)

(56) References Cited

U.S. PATENT DOCUMENTS

| | | |
|---|---|---|
| 5,132,992 A | 7/1992 | Yurt et al. |
| 5,341,474 A | 8/1994 | Gelman et al. |
| 5,400,401 A | 3/1995 | Wasilewski et al. |
| 5,477,263 A | 12/1995 | Ocallaghan et al. |
| 5,544,318 A | 8/1996 | Schmitz et al. |
| 5,550,863 A | 8/1996 | Yurt et al. |
| 5,574,785 A | 11/1996 | Ueno et al. |
| 5,600,721 A | 2/1997 | Kitazato |
| 5,614,940 A | 3/1997 | Cobbley et al. |
| 5,621,794 A | 4/1997 | Matsuda et al. |
| 5,630,005 A | 5/1997 | Ort |
| 5,642,338 A | 6/1997 | Fukushima et al. |
| 5,761,417 A | 6/1998 | Henley et al. |
| 5,805,700 A | 9/1998 | Nardone et al. |
| 5,813,010 A | 9/1998 | Kurano et al. |
| 5,828,370 A | 10/1998 | Moeller et al. |
| 5,838,791 A | 11/1998 | Torii et al. |
| 5,852,664 A | 12/1998 | Iverson et al. |
| 5,854,873 A | 12/1998 | Mori et al. |
| 5,874,986 A | 2/1999 | Gibbon et al. |
| 5,878,135 A | 3/1999 | Blatter et al. |
| 5,892,915 A | 4/1999 | Duso et al. |
| 5,907,658 A | 5/1999 | Murase et al. |
| 5,923,869 A | 7/1999 | Kashiwagi et al. |
| 5,973,679 A | 10/1999 | Abbott et al. |
| 6,002,834 A | 12/1999 | Hirabayashi et al. |
| 6,009,237 A | 12/1999 | Hirabayashi et al. |
| 6,016,381 A | 1/2000 | Taira et al. |
| 6,038,316 A | 3/2000 | Dwork et al. |
| 6,057,832 A | 5/2000 | Lev et al. |
| 6,065,050 A | 5/2000 | DeMoney |
| 6,108,422 A | 8/2000 | Newby et al. |
| 6,151,634 A | 11/2000 | Glaser et al. |
| 6,154,172 A | 11/2000 | Piccionelli et al. |
| 6,154,173 A | 11/2000 | Lennen et al. |
| 6,199,107 B1 | 3/2001 | Dujari |
| 6,226,618 B1 | 5/2001 | Downs et al. |
| 6,263,313 B1 | 7/2001 | Milsted et al. |
| 6,266,483 B1 | 7/2001 | Okada et al. |
| 6,282,320 B1 | 8/2001 | Hasegawa et al. |
| 6,320,905 B1 | 11/2001 | Konstantinides |
| 6,347,145 B2 | 2/2002 | Kato et al. |
| 6,351,538 B1 | 2/2002 | Uz |
| 6,373,803 B2 | 4/2002 | Ando et al. |
| 6,389,473 B1 | 5/2002 | Carmel et al. |
| 6,389,538 B1 | 5/2002 | Gruse et al. |
| 6,398,245 B1 | 6/2002 | Gruse et al. |
| 6,415,031 B1 | 7/2002 | Colligan et al. |
| 6,445,877 B1 | 9/2002 | Okada et al. |
| 6,453,115 B1 | 9/2002 | Boyle |
| 6,453,116 B1 | 9/2002 | Ando et al. |
| 6,504,873 B1 | 1/2003 | Vehvilaeinen |
| 6,512,883 B2 | 1/2003 | Shim et al. |
| 6,516,064 B1 | 2/2003 | Osawa et al. |
| 6,535,920 B1 | 3/2003 | Parry et al. |
| 6,578,200 B1 | 6/2003 | Takao et al. |
| 6,587,837 B1 | 7/2003 | Spagna et al. |
| 6,594,699 B1 | 7/2003 | Sahai et al. |
| 6,654,933 B1 | 11/2003 | Abbott et al. |
| 6,671,408 B1 | 12/2003 | Kaku |
| 6,690,838 B2 | 2/2004 | Zhou |
| 6,721,794 B2 | 4/2004 | Taylor et al. |
| 6,724,944 B1 | 4/2004 | Kalevo et al. |
| 6,741,252 B2 | 5/2004 | Hijiri et al. |
| 6,742,082 B1 | 5/2004 | Lango et al. |
| 6,751,623 B1 | 6/2004 | Basso et al. |
| 6,810,131 B2 | 10/2004 | Nakagawa et al. |
| 6,813,437 B2 | 11/2004 | Ando et al. |
| 6,859,791 B1 | 2/2005 | Spagna et al. |
| 6,868,143 B1 | 3/2005 | Menon et al. |
| 6,871,006 B1 | 3/2005 | Oguz et al. |
| 6,912,513 B1 | 6/2005 | Candelore |
| 6,931,531 B1 | 8/2005 | Takahashi |
| 6,931,543 B1 | 8/2005 | Pang et al. |
| 6,957,350 B1 | 10/2005 | Demos |
| 6,959,288 B1 | 10/2005 | Medina et al. |
| 6,965,646 B1 | 11/2005 | Firestone |
| 6,970,564 B1 | 11/2005 | Kubota et al. |
| 6,983,079 B2 | 1/2006 | Kim |
| 7,006,757 B2 | 2/2006 | Ando et al. |
| 7,007,170 B2 | 2/2006 | Morten |
| 7,020,287 B2 | 3/2006 | Unger |
| 7,023,992 B1 | 4/2006 | Kubota et al. |
| 7,043,021 B2 | 5/2006 | Graunke et al. |
| 7,051,110 B2 | 5/2006 | Hagai et al. |
| 7,058,177 B1 | 6/2006 | Trimberger et al. |
| 7,073,191 B2 | 7/2006 | Srikantan et al. |
| 7,103,906 B1 | 9/2006 | Katz et al. |
| 7,110,542 B1 | 9/2006 | Tripathy |
| 7,120,250 B2 | 10/2006 | Candelore |
| 7,124,303 B2 | 10/2006 | Candelore et al. |
| 7,139,868 B2 | 11/2006 | Parry et al. |
| 7,143,289 B2 | 11/2006 | Denning et al. |
| 7,151,832 B1 | 12/2006 | Fetkovich et al. |
| 7,167,560 B2 | 1/2007 | Yu |
| 7,177,818 B2 | 2/2007 | Nair |
| 7,188,183 B1 | 3/2007 | Paul et al. |
| 7,203,313 B2 | 4/2007 | England et al. |
| 7,212,726 B2 | 5/2007 | Zetts |
| 7,231,516 B1 | 6/2007 | Sparrell et al. |
| 7,233,669 B2 | 6/2007 | Candelore |
| 7,233,948 B1 | 6/2007 | Shamoon et al. |
| 7,242,772 B1 | 7/2007 | Tehranchi |
| 7,274,861 B2 | 9/2007 | Yahata et al. |
| 7,295,673 B2 | 11/2007 | Grab et al. |
| 7,295,752 B1 | 11/2007 | Jain et al. |
| 7,302,490 B1 | 11/2007 | Gupta et al. |
| 7,315,829 B1 | 1/2008 | Tagawa et al. |
| 7,346,163 B2 | 3/2008 | Pedlow, Jr. et al. |
| 7,349,886 B2 | 3/2008 | Morten et al. |
| 7,349,976 B1 | 3/2008 | Glaser et al. |
| 7,352,956 B1 | 4/2008 | Winter et al. |
| 7,363,647 B1 | 4/2008 | Fakharzadeh |
| 7,376,233 B2 | 5/2008 | Candelore et al. |
| 7,382,879 B1 | 6/2008 | Miller |
| 7,397,853 B2 | 7/2008 | Kwon et al. |
| 7,400,679 B2 | 7/2008 | Kwon et al. |
| 7,406,176 B2 | 7/2008 | Zhu et al. |
| 7,418,132 B2 | 8/2008 | Hoshuyama |
| 7,457,415 B2 | 11/2008 | Reitmeier et al. |
| 7,499,930 B2 | 3/2009 | Naka et al. |
| 7,539,213 B2 | 5/2009 | Guillemot et al. |
| 7,546,641 B2 | 6/2009 | Robert et al. |
| 7,577,980 B2 | 8/2009 | Kienzle et al. |
| 7,623,759 B2 | 11/2009 | Shimoda |
| 7,624,337 B2 | 11/2009 | Sull et al. |

(56) References Cited

U.S. PATENT DOCUMENTS

| | | |
|---|---|---|
| 7,627,750 B1 | 12/2009 | Chan |
| 7,627,888 B2 | 12/2009 | Ganesan et al. |
| 7,639,921 B2 | 12/2009 | Seo et al. |
| 7,640,358 B2 | 12/2009 | Deshpande |
| 7,640,435 B2 | 12/2009 | Morten |
| 7,644,172 B2 | 1/2010 | Stewart et al. |
| 7,653,686 B2 | 1/2010 | Yoneda |
| 7,664,262 B2 | 2/2010 | Haruki |
| 7,664,872 B2 | 2/2010 | Osborne et al. |
| 7,697,686 B2 | 4/2010 | Puiatti et al. |
| 7,702,925 B2 | 4/2010 | Hanko et al. |
| 7,711,052 B2 | 5/2010 | Hannuksela et al. |
| 7,734,806 B2 | 6/2010 | Park |
| 7,756,270 B2 | 7/2010 | Shimosato et al. |
| 7,756,271 B2 | 7/2010 | Zhu et al. |
| 7,787,622 B2 | 8/2010 | Sprunk |
| 7,797,720 B2 | 9/2010 | Gopalakrishnan et al. |
| 7,818,444 B2 | 10/2010 | Brueck et al. |
| 7,840,693 B2 | 11/2010 | Gupta et al. |
| 7,853,980 B2 | 12/2010 | Pedlow, Jr. et al. |
| 7,864,186 B2 | 1/2011 | Robotham et al. |
| 7,877,002 B2 | 1/2011 | Ikeda et al. |
| 7,881,478 B2 | 2/2011 | Derouet |
| 7,885,405 B1 | 2/2011 | Bong |
| 7,895,311 B1 | 2/2011 | Juenger |
| 7,907,833 B2 | 3/2011 | Lee |
| 7,925,203 B2 | 4/2011 | Lane et al. |
| 7,945,143 B2 | 5/2011 | Yahata et al. |
| 7,962,942 B1 | 6/2011 | Craner |
| 7,970,835 B2 | 6/2011 | St. Jacques |
| 7,974,714 B2 | 7/2011 | Hoffberg |
| 8,001,471 B2 | 8/2011 | Shaver et al. |
| 8,015,491 B2 | 9/2011 | Shaver et al. |
| 8,073,900 B2 | 12/2011 | Guedalia et al. |
| 8,074,083 B1 | 12/2011 | Lee et al. |
| 8,078,644 B2 | 12/2011 | Hannuksela |
| 8,131,875 B1 | 3/2012 | Chen |
| 8,135,041 B2 | 3/2012 | Ramaswamy |
| 8,148,622 B2 | 4/2012 | Rothkopf et al. |
| 8,160,157 B2 | 4/2012 | Lamy-Bergot et al. |
| 8,169,916 B1 | 5/2012 | Pai et al. |
| 8,170,210 B2 | 5/2012 | Manders et al. |
| 8,171,518 B2 | 5/2012 | White |
| 8,191,097 B1 | 5/2012 | Armstrong et al. |
| 8,213,607 B2 | 7/2012 | Rose et al. |
| 8,213,768 B2 | 7/2012 | Morioka et al. |
| 8,218,439 B2 | 7/2012 | Deshpande |
| 8,243,924 B2 | 8/2012 | Chen et al. |
| 8,266,115 B1 | 9/2012 | Park et al. |
| 8,286,213 B2 | 10/2012 | Seo |
| 8,290,157 B2 | 10/2012 | Candelore |
| 8,311,094 B2 | 11/2012 | Kamariotis et al. |
| 8,312,079 B2 | 11/2012 | Newsome et al. |
| 8,365,235 B2 | 1/2013 | Hunt et al. |
| 8,369,421 B2 | 2/2013 | Kadono et al. |
| 8,380,041 B2 | 2/2013 | Barton et al. |
| 8,397,265 B2 | 3/2013 | Henocq et al. |
| 8,401,188 B1 | 3/2013 | Swaminathan |
| 8,402,156 B2 | 3/2013 | Brueck et al. |
| 8,407,753 B2 | 3/2013 | Kuo |
| 8,423,889 B1 | 4/2013 | Zagorie et al. |
| 8,472,792 B2 | 6/2013 | Butt et al. |
| 8,514,926 B2 | 8/2013 | Ro et al. |
| 8,526,610 B2 | 9/2013 | Shamoon et al. |
| 8,543,842 B2 | 9/2013 | Ginter et al. |
| 8,555,329 B2 | 10/2013 | Fröjdh et al. |
| 8,571,993 B2 | 10/2013 | Kocher et al. |
| 8,630,419 B2 | 1/2014 | Mori |
| 8,631,247 B2 | 1/2014 | O'Loughlin et al. |
| 8,638,935 B2 | 1/2014 | Fasoli et al. |
| 8,649,669 B2 | 2/2014 | Braness et al. |
| 8,650,599 B2 | 2/2014 | Shindo et al. |
| 8,677,428 B2 | 3/2014 | Lewis et al. |
| 8,683,066 B2 | 3/2014 | Hurst et al. |
| 8,725,125 B2 | 5/2014 | Klappert et al. |
| 8,731,193 B2 | 5/2014 | Farkash et al. |
| 8,731,369 B2 | 5/2014 | Li et al. |
| 8,782,268 B2 | 7/2014 | Pyle et al. |
| 8,787,570 B2 | 7/2014 | Braness et al. |
| 8,804,956 B2 | 8/2014 | Hiriart |
| 8,806,188 B2 | 8/2014 | Braness et al. |
| 8,818,896 B2 | 8/2014 | Candelore |
| 8,819,116 B1 | 8/2014 | Tomay et al. |
| 8,819,577 B2 | 8/2014 | Fino |
| 8,849,950 B2 | 9/2014 | Stockhammer et al. |
| 8,850,205 B2 | 9/2014 | Choi et al. |
| 8,850,498 B1 | 9/2014 | Roach et al. |
| 8,856,847 B2 | 10/2014 | Soroushian |
| 8,909,682 B2 | 12/2014 | Heller et al. |
| 8,909,922 B2 | 12/2014 | Kiefer et al. |
| 8,914,534 B2 | 12/2014 | Braness et al. |
| 8,918,533 B2 | 12/2014 | Chen et al. |
| 8,918,535 B2 | 12/2014 | Ma et al. |
| 9,009,491 B2 | 4/2015 | Resch |
| 9,015,782 B2 | 4/2015 | Acharya et al. |
| 9,037,683 B1 | 5/2015 | Yoden |
| 9,038,116 B1 | 5/2015 | Knox et al. |
| 9,038,121 B2 | 5/2015 | Kienzle et al. |
| 9,092,646 B2 | 7/2015 | Grab et al. |
| 9,111,098 B2 | 8/2015 | Smith et al. |
| 9,161,005 B2 | 10/2015 | Rose et al. |
| 9,191,151 B2 | 11/2015 | Luby et al. |
| 9,247,311 B2 | 1/2016 | Kiefer |
| 9,270,720 B2 | 2/2016 | Braness et al. |
| 9,380,096 B2 | 6/2016 | Luby et al. |
| 9,380,099 B2* | 6/2016 | Amidei ................. H04L 65/80 |
| 9,386,064 B2 | 7/2016 | Luby et al. |
| 9,485,469 B2 | 11/2016 | Kahn et al. |
| 9,507,776 B2* | 11/2016 | Bartholomew ......... G06F 16/40 |
| 9,615,061 B2 | 4/2017 | Carney et al. |
| 9,628,536 B2 | 4/2017 | Luby et al. |
| 9,661,044 B2 | 5/2017 | Arana et al. |
| 9,674,254 B2 | 6/2017 | Pare et al. |
| 9,761,274 B2 | 9/2017 | Delpuch et al. |
| 9,967,521 B2 | 5/2018 | Kahn et al. |
| 9,998,515 B2 | 6/2018 | Braness et al. |
| 10,154,075 B2 | 11/2018 | Braness et al. |
| 10,171,873 B2 | 1/2019 | Krebs |
| 10,225,298 B2 | 3/2019 | Cen et al. |
| 10,542,061 B2 | 1/2020 | Braness et al. |
| 10,623,458 B2 | 4/2020 | Cen et al. |
| 11,115,450 B2 | 9/2021 | Braness et al. |
| 11,349,892 B2 | 5/2022 | Cen et al. |
| 2001/0021276 A1 | 9/2001 | Zhou |
| 2001/0052077 A1 | 12/2001 | Fung et al. |
| 2001/0052127 A1 | 12/2001 | Seo et al. |
| 2001/0053222 A1 | 12/2001 | Wakao et al. |
| 2002/0048450 A1 | 4/2002 | Zetts |
| 2002/0067432 A1 | 6/2002 | Kondo et al. |
| 2002/0075572 A1 | 6/2002 | Boreczky et al. |
| 2002/0107802 A1 | 8/2002 | Philips |
| 2002/0114330 A1 | 8/2002 | Cheung et al. |
| 2002/0135607 A1 | 9/2002 | Kato et al. |
| 2002/0141503 A1 | 10/2002 | Kobayashi et al. |
| 2002/0154779 A1 | 10/2002 | Asano et al. |
| 2002/0161797 A1 | 10/2002 | Gallo et al. |
| 2002/0164024 A1 | 11/2002 | Arakawa et al. |
| 2002/0169926 A1 | 11/2002 | Pinckney et al. |
| 2002/0169971 A1 | 11/2002 | Asano et al. |
| 2003/0002577 A1 | 1/2003 | Pinder |
| 2003/0043847 A1 | 3/2003 | Haddad |
| 2003/0044080 A1 | 3/2003 | Frishman et al. |
| 2003/0051237 A1 | 3/2003 | Sako et al. |
| 2003/0053541 A1 | 3/2003 | Sun et al. |
| 2003/0061369 A1 | 3/2003 | Aksu et al. |
| 2003/0063675 A1 | 4/2003 | Kang et al. |
| 2003/0077071 A1 | 4/2003 | Lin et al. |
| 2003/0078930 A1 | 4/2003 | Surcouf et al. |
| 2003/0079222 A1 | 4/2003 | Boykin et al. |
| 2003/0081776 A1 | 5/2003 | Candelore |
| 2003/0135633 A1 | 7/2003 | Dror et al. |
| 2003/0135742 A1 | 7/2003 | Evans |
| 2003/0142594 A1 | 7/2003 | Tsumagari et al. |
| 2003/0152224 A1 | 8/2003 | Candelore et al. |

(56) References Cited

U.S. PATENT DOCUMENTS

| | | |
|---|---|---|
| 2003/0206717 A1 | 11/2003 | Yogeshwar et al. |
| 2003/0225696 A1 | 12/2003 | Niwa |
| 2003/0236907 A1 | 12/2003 | Stewart et al. |
| 2004/0001594 A1 | 1/2004 | Krishnaswamy et al. |
| 2004/0003008 A1 | 1/2004 | Wasilewski et al. |
| 2004/0022391 A1 | 2/2004 | Obrien |
| 2004/0028227 A1 | 2/2004 | Yu |
| 2004/0037421 A1 | 2/2004 | Truman |
| 2004/0047592 A1 | 3/2004 | Seo et al. |
| 2004/0047607 A1 | 3/2004 | Seo et al. |
| 2004/0049690 A1 | 3/2004 | Candelore et al. |
| 2004/0049694 A1 | 3/2004 | Candelore |
| 2004/0073917 A1 | 4/2004 | Pedlow et al. |
| 2004/0076237 A1 | 4/2004 | Kadono et al. |
| 2004/0081333 A1 | 4/2004 | Grab et al. |
| 2004/0088557 A1 | 5/2004 | Malcolm et al. |
| 2004/0093494 A1 | 5/2004 | Nishimoto et al. |
| 2004/0101059 A1 | 5/2004 | Joch et al. |
| 2004/0101142 A1 | 5/2004 | Nasypny |
| 2004/0107356 A1 | 6/2004 | Shamoon et al. |
| 2004/0213094 A1 | 10/2004 | Suzuki |
| 2004/0243714 A1 | 12/2004 | Wynn et al. |
| 2004/0267952 A1 | 12/2004 | He et al. |
| 2005/0005025 A1 | 1/2005 | Harville et al. |
| 2005/0005143 A1 | 1/2005 | Lang et al. |
| 2005/0013494 A1 | 1/2005 | Srinivasan et al. |
| 2005/0063541 A1 | 3/2005 | Candelore |
| 2005/0066063 A1 | 3/2005 | Grigorovitch et al. |
| 2005/0076232 A1 | 4/2005 | Kawaguchi |
| 2005/0102371 A1 | 5/2005 | Aksu |
| 2005/0120132 A1 | 6/2005 | Hutter |
| 2005/0138655 A1 | 6/2005 | Zimler et al. |
| 2005/0144468 A1 | 6/2005 | Northcutt |
| 2005/0177741 A1 | 8/2005 | Chen et al. |
| 2005/0190911 A1 | 9/2005 | Pare et al. |
| 2005/0192904 A1 | 9/2005 | Candelore |
| 2005/0195975 A1 | 9/2005 | Kawakita |
| 2005/0198364 A1 | 9/2005 | Val et al. |
| 2005/0207442 A1 | 9/2005 | Zoest et al. |
| 2005/0207578 A1 | 9/2005 | Matsuyama et al. |
| 2005/0216752 A1 | 9/2005 | Hofmeyr et al. |
| 2005/0227773 A1 | 10/2005 | Lu et al. |
| 2005/0243912 A1 | 11/2005 | Kwon et al. |
| 2005/0262257 A1 | 11/2005 | Major et al. |
| 2005/0265555 A1 | 12/2005 | Pippuri |
| 2006/0013568 A1 | 1/2006 | Rodriguez |
| 2006/0015580 A1 | 1/2006 | Gabriel et al. |
| 2006/0026654 A1 | 2/2006 | An et al. |
| 2006/0037057 A1 | 2/2006 | Xu |
| 2006/0093318 A1 | 5/2006 | Cohen et al. |
| 2006/0095472 A1 | 5/2006 | Krikorian et al. |
| 2006/0109856 A1 | 5/2006 | Deshpande |
| 2006/0129909 A1 | 6/2006 | Butt et al. |
| 2006/0165163 A1 | 7/2006 | Burazerovic et al. |
| 2006/0168298 A1 | 7/2006 | Aoki et al. |
| 2006/0210245 A1 | 9/2006 | Mccrossan et al. |
| 2006/0212370 A1 | 9/2006 | Shear et al. |
| 2006/0218251 A1 | 9/2006 | Tanabe |
| 2006/0235883 A1 | 10/2006 | Krebs |
| 2007/0044010 A1 | 2/2007 | Sull et al. |
| 2007/0047645 A1 | 3/2007 | Takashima |
| 2007/0055982 A1 | 3/2007 | Spilo |
| 2007/0067472 A1 | 3/2007 | Maertens et al. |
| 2007/0074254 A1* | 3/2007 | Sloo .................. H04N 21/4828 725/52 |
| 2007/0083467 A1 | 4/2007 | Lindahl et al. |
| 2007/0106863 A1 | 5/2007 | Bonwick et al. |
| 2007/0157267 A1 | 7/2007 | Lopez-Estrada |
| 2007/0162568 A1 | 7/2007 | Gupta et al. |
| 2007/0162981 A1 | 7/2007 | Morioka et al. |
| 2007/0166000 A1 | 7/2007 | Nallur et al. |
| 2007/0180051 A1 | 8/2007 | Kelly et al. |
| 2007/0201502 A1 | 8/2007 | Abramson |
| 2007/0204003 A1 | 8/2007 | Abramson |
| 2007/0204011 A1 | 8/2007 | Shaver et al. |
| 2007/0204115 A1 | 8/2007 | Abramson |
| 2007/0220118 A1 | 9/2007 | Loyer |
| 2007/0250536 A1 | 10/2007 | Tanaka et al. |
| 2008/0008455 A1 | 1/2008 | De Lange et al. |
| 2008/0022005 A1 | 1/2008 | Wu et al. |
| 2008/0040239 A1 | 2/2008 | Jacobi et al. |
| 2008/0086570 A1 | 4/2008 | Dey et al. |
| 2008/0101718 A1 | 5/2008 | Yang et al. |
| 2008/0137847 A1 | 6/2008 | Candelore et al. |
| 2008/0155615 A1 | 6/2008 | Craner et al. |
| 2008/0160911 A1 | 7/2008 | Chou et al. |
| 2008/0168516 A1 | 7/2008 | Flick et al. |
| 2008/0177793 A1 | 7/2008 | Epstein et al. |
| 2008/0282302 A1 | 11/2008 | Steelberg et al. |
| 2008/0294901 A1 | 11/2008 | Farrugia et al. |
| 2008/0301734 A1* | 12/2008 | Goldeen ............ H04N 21/2393 715/740 |
| 2008/0320100 A1 | 12/2008 | Pantos et al. |
| 2009/0010429 A1 | 1/2009 | Kim et al. |
| 2009/0010622 A1 | 1/2009 | Yahata et al. |
| 2009/0013195 A1 | 1/2009 | Ochi et al. |
| 2009/0067367 A1 | 3/2009 | Buracchini et al. |
| 2009/0077143 A1 | 3/2009 | Macy, Jr. |
| 2009/0106082 A1 | 4/2009 | Senti et al. |
| 2009/0132599 A1 | 5/2009 | Soroushian et al. |
| 2009/0169001 A1 | 7/2009 | Tighe et al. |
| 2009/0178090 A1 | 7/2009 | Oztaskent |
| 2009/0187957 A1* | 7/2009 | Avkarogullari .. H04N 21/23439 725/109 |
| 2009/0249081 A1 | 10/2009 | Zayas |
| 2009/0282162 A1 | 11/2009 | Mehrotra et al. |
| 2009/0310819 A1 | 12/2009 | Hatano |
| 2010/0057576 A1 | 3/2010 | Brodersen et al. |
| 2010/0142915 A1 | 6/2010 | Mcdermott et al. |
| 2010/0185854 A1 | 7/2010 | Burns et al. |
| 2010/0191590 A1 | 7/2010 | Hakkarainen et al. |
| 2010/0198943 A1 | 8/2010 | Harrang et al. |
| 2010/0250772 A1 | 9/2010 | Mao |
| 2011/0010466 A1 | 1/2011 | Fan et al. |
| 2011/0035517 A1 | 2/2011 | Minnick et al. |
| 2011/0058675 A1 | 3/2011 | Brueck et al. |
| 2011/0082924 A1 | 4/2011 | Gopalakrishnan |
| 2011/0083009 A1 | 4/2011 | Shamoon et al. |
| 2011/0093447 A1 | 4/2011 | Goto |
| 2011/0096828 A1 | 4/2011 | Chen et al. |
| 2011/0103374 A1 | 5/2011 | Lajoie et al. |
| 2011/0116772 A1 | 5/2011 | Kwon et al. |
| 2011/0135090 A1 | 6/2011 | Chan et al. |
| 2011/0145858 A1 | 6/2011 | Philpott et al. |
| 2011/0158470 A1 | 6/2011 | Martin et al. |
| 2011/0170687 A1 | 7/2011 | Hyodo et al. |
| 2011/0173345 A1 | 7/2011 | Knox et al. |
| 2011/0179185 A1 | 7/2011 | Wang et al. |
| 2011/0179356 A1 | 7/2011 | Bassali |
| 2011/0197261 A1 | 8/2011 | Dong et al. |
| 2011/0231569 A1 | 9/2011 | Luby et al. |
| 2011/0238789 A1 | 9/2011 | Luby et al. |
| 2011/0246661 A1 | 10/2011 | Manzari et al. |
| 2011/0276676 A1 | 11/2011 | Kang et al. |
| 2011/0296048 A1 | 12/2011 | Knox et al. |
| 2011/0314130 A1 | 12/2011 | Strasman |
| 2012/0005312 A1 | 1/2012 | Mcgowan et al. |
| 2012/0005313 A1 | 1/2012 | McGowan et al. |
| 2012/0042090 A1 | 2/2012 | Chen et al. |
| 2012/0047542 A1 | 2/2012 | Lewis et al. |
| 2012/0054856 A1 | 3/2012 | Johansson |
| 2012/0059912 A1 | 3/2012 | Fernando |
| 2012/0110120 A1 | 5/2012 | Willig et al. |
| 2012/0134496 A1 | 5/2012 | Farkash et al. |
| 2012/0137015 A1 | 5/2012 | Sun |
| 2012/0167132 A1 | 6/2012 | Mathews et al. |
| 2012/0170642 A1 | 7/2012 | Braness et al. |
| 2012/0173751 A1* | 7/2012 | Braness ................ H04L 65/612 709/231 |
| 2012/0185608 A1 | 7/2012 | McGowan et al. |
| 2012/0209961 A1 | 8/2012 | McCoy et al. |
| 2012/0254456 A1* | 10/2012 | Visharam ............ H04L 65/762 709/231 |
| 2012/0303766 A1 | 11/2012 | McGowan et al. |

(56) References Cited

U.S. PATENT DOCUMENTS

| | | |
|---|---|---|
| 2012/0311174 A1 | 12/2012 | Bichot et al. |
| 2012/0331167 A1 | 12/2012 | Hunt |
| 2013/0006869 A1 | 1/2013 | Grab et al. |
| 2013/0007200 A1 | 1/2013 | van der Schaar et al. |
| 2013/0007223 A1* | 1/2013 | Luby .............. H04N 21/234327 709/219 |
| 2013/0013803 A1 | 1/2013 | Bichot et al. |
| 2013/0018632 A1 | 1/2013 | Field et al. |
| 2013/0051554 A1 | 2/2013 | Braness et al. |
| 2013/0054958 A1 | 2/2013 | Braness et al. |
| 2013/0054972 A1 | 2/2013 | Thorwirth |
| 2013/0058480 A1* | 3/2013 | Ziskind .............. H04N 21/4344 375/E7.026 |
| 2013/0061045 A1 | 3/2013 | Kiefer et al. |
| 2013/0080267 A1 | 3/2013 | McGowan |
| 2013/0080596 A1 | 3/2013 | McGowan et al. |
| 2013/0080772 A1 | 3/2013 | McGowan et al. |
| 2013/0081110 A1 | 3/2013 | McGowan et al. |
| 2013/0179199 A1* | 7/2013 | Ziskind .............. H04N 21/2387 705/5 |
| 2013/0254346 A1 | 9/2013 | McGowan et al. |
| 2013/0318249 A1 | 11/2013 | McDonough et al. |
| 2014/0003516 A1 | 1/2014 | Soroushian |
| 2014/0003523 A1 | 1/2014 | Soroushian et al. |
| 2014/0068264 A1 | 3/2014 | Lindquist et al. |
| 2014/0140253 A1 | 5/2014 | Lohmar et al. |
| 2014/0149557 A1 | 5/2014 | Lohmar et al. |
| 2014/0223303 A1 | 8/2014 | Cox et al. |
| 2014/0280750 A1 | 9/2014 | Panje et al. |
| 2014/0359075 A1 | 12/2014 | Amidei et al. |
| 2015/0006662 A1 | 1/2015 | Braness |
| 2015/0019550 A1 | 1/2015 | Maharajh et al. |
| 2015/0019866 A1* | 1/2015 | Braness ........... H04N 21/25841 713/168 |
| 2015/0139419 A1 | 5/2015 | Kiefer et al. |
| 2015/0288530 A1 | 10/2015 | Oyman |
| 2016/0164939 A1 | 6/2016 | Braness et al. |
| 2016/0197971 A1 | 7/2016 | Cen et al. |
| 2016/0323342 A1 | 11/2016 | Luby et al. |
| 2017/0011055 A1 | 1/2017 | Pitts |
| 2017/0324793 A1 | 11/2017 | Braness et al. |
| 2018/0046949 A1 | 2/2018 | Kahn et al. |
| 2018/0255366 A1 | 9/2018 | Lockett et al. |
| 2019/0173932 A1 | 6/2019 | Braness et al. |
| 2019/0268394 A1 | 8/2019 | Cen et al. |
| 2020/0106820 A1 | 4/2020 | Braness et al. |
| 2020/0244714 A1 | 7/2020 | Cen et al. |
| 2022/0239717 A1 | 7/2022 | Braness et al. |

FOREIGN PATENT DOCUMENTS

| | | | |
|---|---|---|---|
| CN | 101861583 A | | 10/2010 |
| CN | 103999033 A | | 8/2014 |
| CN | 103999033 B | | 8/2016 |
| CN | 106254900 A | | 12/2016 |
| CN | 107111477 A | | 8/2017 |
| CN | 106254900 B | | 9/2019 |
| CN | 107111477 B | | 5/2021 |
| CN | 113259731 A | | 8/2021 |
| EP | 1158799 A1 | | 11/2001 |
| EP | 1453319 A1 | | 9/2004 |
| EP | 1536646 A1 | | 6/2005 |
| EP | 1283640 B1 | | 10/2006 |
| EP | 2180664 | | 4/2010 |
| EP | 2180664 A1 | | 4/2010 |
| EP | 2360923 A1 | | 8/2011 |
| EP | 3243130 A1 | | 11/2017 |
| EP | 3243130 B1 | | 8/2019 |
| EP | 3570520 A1 | | 11/2019 |
| EP | 3570520 B1 | | 2/2021 |
| EP | 3910904 A1 | | 11/2021 |
| GB | 2398210 A | | 8/2004 |
| HK | 1197306 A1 | | 1/2015 |
| HK | 1229978 A | | 11/2017 |
| HK | 1242001 A | | 6/2018 |
| HK | 1246429 A | | 9/2018 |
| HK | 1246429 B | | 4/2020 |
| HK | 40013764 A | | 8/2020 |
| HK | 1229978 B | | 6/2021 |
| IE | 2005/015935 | | 2/2005 |
| JP | H07143475 A | | 6/1995 |
| JP | H1175178 A | | 3/1999 |
| JP | 2001204001 A | | 7/2001 |
| JP | 2004350043 A | | 12/2004 |
| JP | 2005107725 A | | 4/2005 |
| JP | 2005173241 A | | 6/2005 |
| JP | 2005284041 A | | 10/2005 |
| JP | 2008507160 A | | 3/2008 |
| JP | 2009188690 A | | 8/2009 |
| JP | 2009225116 A | | 10/2009 |
| JP | 4516082 B2 | | 5/2010 |
| JP | 2011087103 A | | 4/2011 |
| JP | 2011087165 A | | 4/2011 |
| JP | 2011204001 A | | 10/2011 |
| JP | 2013509818 A | | 3/2013 |
| JP | 2014506430 A | | 3/2014 |
| JP | 2014528376 A | | 10/2014 |
| JP | 2014529967 A | | 11/2014 |
| JP | 2016036161 A | | 3/2016 |
| JP | 6076347 B2 | | 2/2017 |
| JP | 6254987 B2 | | 12/2017 |
| JP | 2018-505594 A | | 2/2018 |
| JP | 2018064287 A | | 4/2018 |
| JP | 6522723 B2 | | 5/2019 |
| JP | 2019134487 A | | 8/2019 |
| JP | 2020141415 A | | 9/2020 |
| JP | 6944371 B2 | | 9/2021 |
| JP | 6967189 B2 | | 10/2021 |
| JP | 2022000992 A | | 1/2022 |
| JP | 2022132649 A | | 9/2022 |
| KR | 20040039852 A | | 5/2004 |
| KR | 20060030164 A | | 4/2006 |
| KR | 20060106250 A | | 10/2006 |
| KR | 20060116967 A | | 11/2006 |
| KR | 20070020727 A | | 2/2007 |
| KR | 20090016282 A | | 2/2009 |
| KR | 1020100082182 A | | 7/2010 |
| KR | 1020140062479 A | | 5/2014 |
| KR | 10-2017-0103863 A | | 9/2017 |
| KR | 10-1903352 B1 | | 9/2018 |
| KR | 1955363 B1 | | 2/2019 |
| KR | 101955363 B1 | | 3/2019 |
| KR | 10-2012682 | | 8/2019 |
| KR | 10-2166291 B1 | | 10/2020 |
| KR | 10-2323520 B1 | | 11/2021 |
| KR | 10-2395874 B1 | | 5/2022 |
| RU | 2328040 C2 | | 6/2008 |
| SE | WO2011/087449 | | 7/2011 |
| WO | 199800973 A1 | | 1/1998 |
| WO | 199834405 A1 | | 8/1998 |
| WO | 1998047290 | | 10/1998 |
| WO | 2000049762 A2 | | 8/2000 |
| WO | 2000049763 A1 | | 8/2000 |
| WO | 200223315 A2 | | 3/2002 |
| WO | 2003028293 | | 4/2002 |
| WO | 2002035832 A2 | | 5/2002 |
| WO | 2002054776 | | 7/2002 |
| WO | 2002073437 A1 | | 9/2002 |
| WO | 2002087241 A1 | | 10/2002 |
| WO | 2003046750 A1 | | 6/2003 |
| WO | 2003047262 A2 | | 6/2003 |
| WO | 2003061173 A2 | | 7/2003 |
| WO | 2004012378 A2 | | 2/2004 |
| WO | 2004100158 A1 | | 11/2004 |
| WO | 2005008385 A2 | | 1/2005 |
| WO | 2005015935 A1 | | 2/2005 |
| WO | 2005057906 A2 | | 6/2005 |
| WO | 2005111835 A2 | | 11/2005 |
| WO | 2005125214 A2 | | 12/2005 |
| WO | 2006019490 A2 | | 2/2006 |
| WO | 2007072257 A1 | | 6/2007 |
| WO | 2007093923 A1 | | 8/2007 |
| WO | 2007101182 A2 | | 9/2007 |

(56) References Cited

FOREIGN PATENT DOCUMENTS

| WO | 2008032908 A1 | 3/2008 |
|---|---|---|
| WO | 2009006302 A1 | 1/2009 |
| WO | 2005111835 A3 | 3/2009 |
| WO | 2009109976 A2 | 9/2009 |
| WO | 2010079950 A2 | 7/2010 |
| WO | 2011038013 A2 | 3/2011 |
| WO | 2011053658 A1 | 5/2011 |
| WO | 2011087449 A1 | 7/2011 |
| WO | 2011101371 A1 | 8/2011 |
| WO | 2011103364 A1 | 8/2011 |
| WO | WO 2011103364 | 8/2011 |
| WO | 2012094171 A1 | 7/2012 |
| WO | 2013032517 A1 | 3/2013 |
| WO | 2013101841 A1 | 7/2013 |
| WO | 2016112112 A1 | 7/2016 |

OTHER PUBLICATIONS

Liu, Yunqiang; Yu, Songyu. Streaming Media Delivery with Proxy Cache for Heterogeneous Clients. 2005 IEEE 7th Workshop on Multimedia Signal Processing. https://ieeexplore.ieee.org/stamp/stamp.jsp?tp=&arnumber=4014003 (Year: 2005).*
Ozcelebi, T, et al. Minimum delay content adaptive video streaming over variable bitrate channels with a novel stream switching solution. IEEE International Conference on Image Processing 2005. https://ieeexplore.IEEE.org/stamp/stamp.jsp?tp=&arnumber=1529724 (Year: 2005).*
Fetoh, Hatem et al. A proposed framework for segment transmission scheduling in P2P video streaming. 2014 9th International Conference on Informatics and Systems, https://ieeexplore.ieee.org/stamp/stamp.jsp?tp=&arnumber=7036714 (Year: 2014).*
Wu, Dajun et al. A scalable to lossless audio streaming system applicable to mobile devices. 2011 6th IEEE Conference on Industrial Electronics and Applications. 2011 6th IEEE Conference on Industrial Electronics and Applications (Year: 2011).*
Sarwar, Golam et al. Xstream-X264: Real-time H.264 streaming with cross-layer integration. 2011 IEEE International Conference on Multimedia and Expo. https://ieeexplore.ieee.org/stamp/stamp.jsp?tp=&arnumber=6012056 (Year: 2011).*
Declaration of Dr. Clifford Reader, Inter Partes Review of U.S. Pat. No. 9,270,720, 158 pgs, IPR filed Mar. 11, 2020.
Declaration of Dr. Clifford Reader, Inter Partes Review of U.S. Pat. No. 9,998,515, 184 pgs., IPR filed Mar. 11, 2020.
Defendant Hulu, LLC's Invalidity Contentions for U.S. Pat. No. 7,295,673; U.S. Pat. No. 8,139,651; U.S. Pat. No. 8,472,792; U.S. Pat. No. 9,270,720; U.S. Pat. No. 9,998,515; U.S. Pat. No. 10,212,486; U.S. Pat. No. 10,225,588, *DIVX, LLC v. Hulu, LLC*, Case No. 2:19-cv-1606-PSG-DFMx, C.D. Cal., Apr. 2, 2020, 136 pgs.
Defendant Netflix, Inc.'s Invalidity Contentions for U.S. Pat No. 7,295,673; U.S. Pat. No. 8,139,651; U.S. Pat. No. 8,472,792; U.S. Pat. No. 9,270,720; U.S. Pat. No. 9,998,515; U.S. Pat. No. 10,212,486; U.S. Pat. No. 10,225,588; U.S. Pat. No. 9,184,920, *DIVX, LLC v. Netflix, Inc.*, Case No. 2:19-cv-1602-PSG-DFM, C.D. Cal., Apr. 2, 2020, 148 pgs.
Excerpt from DivX Infringement Contentions in U.S. Pat. No. 9,270,720 Patent (re Hulu), IPR2020-00647 filed Mar. 11, 2020, 8 pgs.
Excerpt from DivX Infringement Contentions in U.S. Pat. No. 9,270,720 Patent (re Netflix), IPR2020-00647 filed Mar. 11, 2020, 1 page.
Excerpts from DivX's Contentions to Hulu, U.S. Pat. No. 9,998,515, IPR2020-00648, filed Mar. 11, 2020, 5 pgs.
Excerpts from DivX's Contentions to Netflix, U.S. Pat. No. 9,998,515, IPR2020-00648, filed Mar. 11, 2020, 26 pgs.
Extended European Search Report for European Application No. 16735361.4, Search completed Jul. 10, 2018, dated Jul. 18, 2018 8 Pgs.
Extended European Search Report for European Application No. 19185179.9, Search completed Jul. 26, 2019, dated Aug. 5, 2019, 10 Pgs.
Extended European Search Report for European Application No. 21158343.0, Search completed Sep. 30, 2021, dated Oct. 11, 2021, 10 Pgs.
Information Technology—MPEG Systems Technologies—Part 7: Common Encryption in ISO Base Media File Format Files (ISO/IEC 23001-7), Apr. 2015, 24 pgs.
International Preliminary Report on Patentability for International Application No. PCT/US2011/068274, International Filing Date Dec. 31, 2011, dated Mar. 4, 2014, 13 pgs.
International Preliminary Report on Patentability for International Application PCT/US2016/012348 Report dated Jul. 11, 2017, dated Jul. 20, 2017 7 Pgs.
International Search Report and Written Opinion for International Application No. PCT/US2016/012348, completed Feb. 11, 2016, dated Mar. 4, 2016, 8 Pgs.
International Search Report and Written Opinion for International Application PCT/US2011/68274, Report Completed Apr. 10, 2012, 16 pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media File Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
Microsoft Corporation, Advanced Systems Format (ASF) Specification, Revision Jan. 20, 2003, Dec. 2004, 121 pgs.
MPEG-DASH presentation at Streaming Media West 2011, Nov. 2011, 14 pgs.
Petition for Inter Partes Review of U.S. Pat. No. 9,270,720, IPR2020-00647, 82 pgs., IPR filed Mar. 11, 2020.
Petition for Inter Partes Review of U.S. Pat. No. 9,998,515, IPR2020-00648, 85 pgs., IPR filed Mar. 11, 2020.
Pomelo, LLC Tech Memo, Analysis of Netflix's Security Framework for 'Watch Instantly' Service, Mar.-Apr. 2009, 18 pgs.
Power of Attorney—Hulu, LLC, (IPR2020-00647), 4 pgs., IPR filed Mar. 11, 2020.
Power of Attorney—Hulu, LLC, (IPR2020-00648), 4 pgs., IPR filed Mar. 11, 2020.
Power of Attorney—Netflix, Inc. (IPR2020-00647), 4 pgs., IPR filed Mar. 11, 2020.
Power of Attorney—Netflix, Inc. (IPR2020-00648), 4 pgs., IPR filed Mar. 11, 2020.
Prosecution File History for U.S. Pat. No. 9,270,720, IPR filed Mar. 11, 2020, 350 pgs.
Prosecution File History for U.S. Pat. No. 9,998,515, IPR filed Mar. 11, 2020, 1189 pgs., presented in four parts.
Server-Side Stream Repackaging (Streaming Video Technologies Panorama, Part 2), Jul. 2011, 15 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
"Apple HTTP Live Streaming specification", Aug. 2017, 60 pgs.
"Data Encryption Decryption using AES Algorithm, Key and Salt with Java Cryptography Extension", Available at https://www.digizol.com/2009/10/java-encrypt-decrypt-jce-salt.html, Oct. 200, 6 pgs.
"Delivering Live and On-Demand Smooth Streaming", Microsoft Silverlight, 2009, 28 pgs.
"H.264—A Complete Guide to the Video Codec", May 2003, Retrieved from https://www.encoding.com/h-264/, 2 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.

(56) References Cited

OTHER PUBLICATIONS

"Information technology—Dynamic adaptive streaming for HTTP (DASH); Part 1: Media presentation and description and segment formats", International Standard, ISO/IEC 23009-1, Second edition May 15, 2014, 152 pgs.

"Information Technology—Coding of Audio Visual Objects—Part 2: Visual", International Standard, ISO/IEC 14496-2, Third Edition, Jun. 1, 2004, pp. 1-724. (presented in three parts).

"Java Cryptography Architecture API Specification & Reference", Available at https://docs.oracle.com/javase/1.5.0/docs/guide/security/CryptoSpec.html, Jul. 25, 2004, 68 pgs.

"Java Cryptography Extension, javax.crypto.Cipher class", Available at https://docs.oracle.com/javase/1.5.0/docs/api/javax/crypto/Cipher.html, 2004, 24 pgs.

"JCE Encryption—Data Encryption Standard (DES) Tutorial", Available at https://mkyong.com/java/jce-encryption-data-encryption-standard-des-tutorial/, Feb. 25, 2009, 2 pgs.

"Link Up Inc", Imasugu tsukaeru kantan (ready-to-use and easy) PLUS+ Google sabisu kanzendaijiten (complete dictionary of Google service), Gijutsu-Hyohron Co., Ltd., Oct. 25, 2014, the first edition, the first impression, p. 226, 228, 233, 238, 239, 242, 243, 244.

"Live and On-Demand Video with Silverlight and IIS Smooth Streaming", Microsoft Silverlight, Windows Server Internet Information Services 7.0, Feb. 2010, 15 pgs.

"Microsoft Smooth Streaming specification", Jul. 22, 2013, 56 pgs.

"MPEG-2, Part 1, ISO/IEC 13818-1", Information technology—Generic Coding of Moving Pictures and Associated Audio: Systems, 161 pgs., Nov. 13, 1994.

"MPEG-4, Part 14, ISO/IEC 14496-14", Information technology—Coding of audio-visual objects, 18 pgs., Nov. 15, 2003.

"OpenDML AVI File Format Extensions Version 1.02", OpenDML AVI MJPEG File Format Subcommittee. Last revision: Feb. 28, 1996. Reformatting: Sep. 1997, 42 pgs.

"Single-Encode Streaming for Multiple Screen Delivery", Telestream Wowza Media Systems, 2009, 6 pgs.

"Sustainability of Digital Formats: Planning for Library of Congress Collections", H.262 MPEG-2 Video Encoding (H.262), 7 pgs.

"Sustainability of Digital Formats: Planning for Library of Congress Collections", MPEG-4, Visual Coding (Part 2), (Last Updated: Feb. 21, 2017), 6 pgs.

"The MPEG-DASH Standard for Multimedia Streaming Over the Internet", IEEE MultiMedia, vol. 18, No. 4, 2011, 7 pgs.

"Window Microsoft codecs", 2017, Retrieved from https://msdn.microsoft.com/en-us/library/windows/desktop/ff819508(v=vs.85).aspx, 7 pgs.

"Windows Media Player 9", Microsoft, Mar. 23, 2017, 3 pgs.

Abomhara et al., "Enhancing Selective Encryption for H.264/AVC Using Advanced Encryption Standard", International Journal of computer Theory and Engineering, Apr. 2010, vol. 2, No. 2, pp. 223-229.

Alattar et al., A.M. "Improved selective encryption techniques for secure transmission of MPEG video bit-streams", In Proceedings 1999 International Conference on Image Processing (Cat. 99CH36348), vol. 4, IEEE, 1999, pp. 256-260.

Antoniou et al., "Adaptive Methods for the Transmission of Video Streams in Wireless Networks", 2015, 50 pgs.

Apostolopoulos et al., "Secure Media Streaming and Secure Transcoding", Multimedia Security Technologies for Digital Rights Management, 2006, 33 pgs.

Asai et al., "Essential Factors for Full-Interactive VOD Server: Video File System, Disk Scheduling, Network", Proceedings of Globecom '95, Nov. 14-16, 1995, 6 pgs.

Beker et al., "Cipher Systems, The Protection of Communications", 1982, 40 pgs.

Bertazzo et al., "L2L (Live to e-Learning): Building a Consortium-Wide Lecture Capture and Delivery Service Using a Digital Asset Management Platform", IEEE International Symposium on Multimedia. https://ieeexplore.ieee.org/stamp/stamp.jsp?tp=&arnumber=5693873 (Year 2010).

Bocharov et al., "Portable Encoding of Audio-Video Objects, The Protected Interoperable File Format (PIFF)", Microsoft Corporation, First Edition Sep. 8, 2009, 30 pgs.

Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).

Caglar et al., "MUVIS: A Content-Based Multimedia Indexing and Retrieval Framework", 2003 Proceedings of Seventh International Symposium on Signal Processing and Its Applications, Jul. 4, 2003, vol. 1, pp. 1-8, DOI: 10.1109/ISSPA.2003.1224626.

Cahill et al., "Locally Adaptive Deblocking Filter for Low Bit Rate Video", Proceedings 2000 International Conference on Image Processing, Sep. 10-13, 2000, Vancouver, BC, Canada, 4 pgs.

Candelore, U.S. Appl. No. 60/372,901, filed Apr. 17, 2002, 5 pgs.

Chaddha et al., "A Frame-work for Live Multicast of Video Streams over the Internet", Proceedings of 3rd IEEE International Conference on Image Processing, Sep. 19, 1996, Lausanne, Switzerland, 4 pgs.

Chen et al., "A Spatio-Temporal Semantic Model for Multimedia Database Systems and Multimedia Information Systems", IEEE Transactions on Knowledge and Data Engineering, Jul./Aug. 2011, vol. 13, No. 4, pp. 607-622, DOI: 10.1109/69.940735.

Chen et al., "Audio-on-Demand over Wireless Sensor Networks", 2012 IEEE 20th International Workshop on Quality of Service, Jun. 4-5, 2012, pp. 1-9, DOI: 10.1109/IWQoS.2012.6245981.

Cheng, "Partial Encryption for Image and Video Communication", Thesis, Fall 1998, 95 pgs.

Cheng et al., "Partial encryption of compressed images and videos", IEEE Transactions on Signal Processing, vol. 48, No. 8, Aug. 2000, 33 pgs.

Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.

Collet, "Delivering Protected Content, An Approach for Next Generation Mobile Technologies", Thesis, 2010, 84 pgs.

Diamantis et al., "Real Time Video Distribution using Publication through a Database", Proceedings SIBGRAPI'98. International Symposium on Computer Graphics, Image Processing, and Vision (Cat. No.98EX237), Oct. 1990, 8 pgs.

Ding et al., "Multisource Video On-Demand Streaming in Wireless Mesh Networks", IEEE/ACM Transactions on Networking, Dec. 2012, Date of Publication: Mar. 7, 2012, vol. 20, No. 6, pp. 1800-1813, DOI: 10.1109/TNET.2012.2188642.

Dworkin, "Recommendation for Block Cipher Modes of Operation: Methods and Techniques", NIST Special Publication 800-38A, 2001, 66 pgs.

Fang et al., "Real-time deblocking filter for MPEG-4 systems", Asia-Pacific Conference on Circuits and Systems, Oct. 28-31, 2002, Bail, Indonesia, pp. 541-544.

Fecheyr-Lippens, "A Review of HTTP Live Streaming", Jan. 2010, 38 pgs.

Fielding et al., "Hypertext Transfer Protocol—HTTP1.1", Network Working Group, RFC 2616, Jun. 1999, 114 pgs.

Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, pp. 969-972.

Guo et al., "A Multi-server Video Monitor System Based on Stream-Media Communication Technology", 2008 2nd International Symposium on Systems and Control in Aerospace and Astronautics, Dec. 10-12, 2008, Shenzhen, China, pp. 1-4, DOI: 10.1109/ISSCAA.2008.4776278.

Huang, U.S. Pat. No. 7,729,426, U.S. Appl. No. 11/230,794, filed Sep. 20, 2005, 143 pgs.

Huang et al., "Adaptive MLP post-processing for block-based coded images", IEEE Proceedings—Vision, Image and Signal Processing, vol. 147, No. 5, Oct. 2000, pp. 463-473.

Huang et al., "Architecture Design for Deblocking Filter in H.264/JVT/AVC", 2003 International Conference on Multimedia and Expo., Jul. 6-9, 2003, Baltimore, MD, 4 pgs.

(56) References Cited

OTHER PUBLICATIONS

Islam, "HTTP Streaming Video Server with Dynamic Advertisement Splicing", Royal Institute of Technology (KTH), School of Information and Communication Technology, Master of Science Thesis, Mar. 21, 2010, Retrieved from: https://people.kth.se/~maguire/DEGREE-PROJECT-REPORTS/100409-Md._Safiqul_lslam-with-cover.pdf, 108 pgs.

Jain et al., U.S. Appl. No. 61/522,623, filed Aug. 11, 2011, 44 pgs.

Jung et al., "Design and Implementation of an Enhanced Personal Video Recorder for DTV", IEEE Transactions on Consumer Electronics, vol. 47, No. 4, Nov. 2001, 6 pgs.

Kalva, Hari "Delivering MPEG-4 Based Audio-Visual Services", 2001, 113 pgs.

Kang et al., "Access Emulation and Buffering Techniques for Steaming of Non-Stream Format Video Files", IEEE Transactions on Consumer Electronics, vol. 43, No. 3, Aug. 2001, 7 pgs.

Kim et al., "A Deblocking Filter with Two Separate Modes in Block-Based Video Coding", IEEE transactions on circuits and systems for video technology, vol. 9, No. 1, 1999, pp. 156-160.

Kim et al., "Tree-Based Group Key Agreement", Feb. 2004, 37 pgs.

Laukens, "Adaptive Streaming—A Brief Tutorial", EBU Technical Review, 2011, 6 pgs.

Legault et al., "Professional Video Under 32-bit Windows Operating Systems", SMPTE Journal, vol. 105, No. 12, Dec. 1996, 10 pgs.

Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.

List et al., "Adaptive deblocking filter", IEEE transactions on circuits and systems for video technology, vol. 13, No. 7, Jul. 2003, pp. 614-619.

Massoudi et al., "Overview on Selective Encryption of Image and Video: Challenges and Perspectives", EURASIP Journal on Information Security, Nov. 2008, 18 pgs.

McCanne et al., "Receiver-driven Layered Multicast", Conference proceedings on Applications, technologies, architectures, and protocols for computer communications, Aug. 1996, 14 pgs.

Meier, "Reduction of Blocking Artifacts in Image and Video Coding", IEEE Transactions on Circuits and Systems for Video Technology, vol. 9, No. 3, Apr. 1999, pp. 490-500.

Miras, "On Quality Aware Adaptation of Internet Video", University of London, PhD dissertation, May 2004, 181 pgs.

Nelson, "Smooth Streaming Deployment Guide", Microsoft Expression Encoder, Aug. 2010, 66 pgs.

Newton et al., "Preserving Privacy by De-identifying Facial Images", Carnegie Mellon University School of Computer Science, Technical Report, CMU-CS-03-119, Mar. 2003, 26 pgs.

O'Brien, U.S. Appl. No. 60/399,846, filed Jul. 30, 2002, 27 pgs.

O'Rourke, "Improved Image Decompression for Reduced Transform Coding Artifacts", IEEE Transactions on Circuits and Systems for Video Technology, vol. 5, No. 6, Dec. 1995, pp. 490-499.

Padiadpu, Rashmi "Towards Mobile Learning: A SCORM Player for the Google Android Platform", Master Thesis, Hamburg University of Applied Sciences, 2008, 66 pgs.

Park et al., "A postprocessing method for reducing quantization effects in low bit-rate moving picture coding", IEEE Transactions on Circuits and Systems for Video Technology, vol. 9, No. 1, Feb. 1999, pp. 161-171.

Pathan, "Cloud-Based Content Delivery and Streaming", Advanced Content Delivery, Streaming, and Cloud Services Publisher: Wiley-IEEE Press. https://ieeexplore.ieee.org/xpl/ebooks/bookPdfWithBanner.jsp?fileNanne=7777615.pdf&bkn=7748400&pdfType=chapter (Year: 2014).

Paul et al., "VTonDemand: A Framework for Indexing, Searching, and On-Demand Playback of RTP-Based Multimedia Conferences", 1999 IEEE Third Workshop on Multimedia Signal Processing (Cat. No. 99th8451), Sep. 13-15, 1999, pp. 59-64, DOI: 10.1109/MMSP.1999.793798.

Richardson, "H.264 and MPEG-4 Video Compression", Wiley, 2003, 306 pgs. (presented in 2 parts).

Shah et al., "Localising Peers in P2P Live Streaming Systems Within Resource-Constrained Networks", 2012 International Conference on Computer&Information Science (ICCIS), Year. 2012, pp. 683-688, https://ieeexplore.ieee.org/stamp/stamp.jsp?tp=&arnumber=6297115.

Sima et al., "An Efficient Architecture for Adaptive Deblocking Filter of H.264 AVC Video Coding", IEEE Transactions on Consumer Electronics, vol. 50, No. 1, Feb. 2004, pp. 292-296.

Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.

Srinivasan et al., "Windows Media Video 9: overview and applications", Signal Processing: Image Communication, 2004, 25 pgs.

Stockhammer, "Dynamic Adaptive Streaming over HTTP—Standards and Design Principles", Proceedings of the second annual ACM conference on Multimedia, Feb. 2011, pp. 133-145.

Timmerer et al., "HTTP Streaming of MPEG Media", Proceedings of Streaming Day, 2010, 4 pgs.

Tiphaigne et al., "A Video Package for Torch", Jun. 2004, 46 pgs.

Toldo et al., "A Resilent and Low-Delay P2P Streaming System Based on Network Coding with Random Multicast Trees", 2010 IEEE International Workshop on Multimedia Signal Processing, Year. 2010, pp. 400-405. https://ieeexplore.ieee.org/stamp/stamp.jsp?tp=&arnumber=5662054.

Trappe et al., "Key Management and Distribution for Secure Multimedia Multicast", IEEE Transaction on Multimedia, vol. 5, No. 4, Dec. 2003, pp. 544-557.

Van Deursen et al., "On Media Delivery Protocols in the Web", 2010 IEEE International Conference on Multimedia and Expo, Jul. 19-23, 2010, 6 pgs.

Ventura, Guillermo Albaida "Streaming of Multimedia Learning Objects", AG Integrated Communication System, Mar. 2003, 101 pgs.

Waggoner, "Compression for Great Digital Video", 2002, 184 pgs.

Watanabem et al., "MPEG-2 decoder enables DTV trick plays", esearcher System LSI Development Lab, Fujitsu Laboratories Ltd., Kawasaki, Japan, Jun. 2001, 2 pgs.

Wei, "Pardon Our Dust", Hulu Blog, printed Apr. 30, 2014 from http://blog.hulu.com.2010/05/13/pardon-our-dust, 10 pgs.

Wiegand, "Joint Video Team (JVT) of ISO/IEC MPEG and ITU-T VCEG", Jan. 2002, 70 pgs.

Willig et al., U.S. Appl. No. 61/409,285, filed Nov. 2, 2010, 43 pgs.

Wowza Media Systems, "Using dynamically generated SMIL file possible:", printed Apr. 30, 14 from http://www.wowza.com.forums/showthread.php?12458-using-dynamically-generated-SMIL-file-possible, 3 pgs.

Yang et al., "Projection-Based Spatially Adaptive Reconstruction of Block-Transform Compressed Images", IEEE Transactions on Image Processing, vol. 4, No. 7, Jul. 1995, pp. 896-908.

Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.

Yu et al., "Video deblocking with fine-grained scalable complexity for embedded mobile computing", Proceedings 7th International Conference on Signal Processing, Aug. 31-Sep. 4, 2004, pp. 1173-1178.

Zakhor, "Iterative Procedures for Reduction of Blocking Effects in Transform Image Coding", IEEE Transactions on Circuits and Systems for Video Technology, vol. 2, No. 1, Mar. 1992, pp. 91-95.

Decision Granting Petitioner's Request on Rehearing 37 C.F.R. § 42.71(d) Granting Institution of Inter Partes Review 35 U.S.C. § 314, IPR2020-00614 U.S. Pat. No. 7,295,673, dated Dec. 16, 2022, 29 pgs.

U.S. Appl. No. 61/409,285 (Puneet), filed Aug. 11, 2011.

U.S. Appl. No. 61/522,623 (Willig), filed Nov. 2, 2010.

"Broadcom BCM7413 Product Brief", Dec. 11, 2008, 2 pgs.

"Common Interface Specification for Conditional Access and other Digital Video Broadcasting Decoder Applications", European Standard, EN 50221, Feb. 1997, 86 pgs.

(56) References Cited

OTHER PUBLICATIONS

"Server 'Trick Play' support for MPEG-2 Transport Stream Files", www.live555.com/liveMedia/transport-stream-trick-play.html, 2006, Dec. 31, 2020, 1 pg.
"The LIVE555 Media Server", www.live555.com/mediaServer/#about, 2006, printed Dec. 31, 2020, 3 pgs.
ADB, "ADB-3800W Datasheet", 2007, 2 pgs.
AGI et al., "An Empirical Study of Secure MPEG Video Transmissions", IEEE, Mar. 1996, 8 pgs., DOI: 10.1109/NDSS.1996.492420.
Ahmed et al., "An Efficient Chaos-Based Feedback Stream Cipher (ECBFSC) for Image Encryption and Decryption", Informatica, Mar. 2007, vol. 31, No. 1, pp. 121-129.
Arachchi et al., "Adaptation-aware encryption of scalable H.264/AVC for content security", Signal Processing: Image Communication, Jul. 2009, vol. 24, pp. 468-483, doi:10.1016/j.image.2009.02.004.
Conklin et al., "Video coding for streaming media delivery on the Internet", IEEE Transactions on Circuits and Systems for Video Technology, Mar. 2001, vol. 11, No. 3, pp. 269-281.
Deshpande et al., "Scalable Streaming of JPEG2000 Images Using Hypertext Transfer Protocol", Multimedia '01: Proceedings of the Ninth ACM International Conference on Multimedia, Oct. 2001, pp. 372-381. https://doi.org/10.1145/500141.500197.
Entone, "Amulet High Definition IP Television Receiver User's Guide", 2008, 28 pgs.
Entone, "Hydra HD IP Video Gateway", 2008, 2 pgs.
ETSI, "Digital Video Broadcasting (DVB) Support for use of scrambling and Conditional Access (CA) within digital broadcasting systems", Oct. 1996, 13 pgs.
ETSI, "Digital Video Broadcasting (DVB); Implementation guidelines for the use of Video and Audio Coding in Contribution and Primary Distribution Applications based on the MPEG-2 Transport Stream", ETSI TS 102 154 V1.2.1, May 2004, 73 pgs.
Fahmi et al., "Proxy Servers for Scalable Interactive Video Support", Computer, Sep. 2001, vol. 45, No. 9, pp. 54-60, https://doi.org/10.1109/2.947092.
Fitzek et al., "A Prefetching Protocol for Continuous Media Streaming in Wireless Environments", IEEE Journal on Selected Areas in Communications, Oct. 2001, vol. 19, No. 10, pp. 2015-2028, DOI: 10.1109/49.957315.
Ho, "Digital Video Broadcasting Conditional Access Architecture", Report prepared for CS265—Section 2, Fall 2002, Prof Stamp, 7 pgs.
INCITS/ISO/IEC, "Information Technology—Generic Coding of Moving Pictures and Associated Audio Information: Video (Formerly ANSI/ISO/IEC 13818-2-2000)", Second edition, Dec. 15, 2000, 220 pgs., (presented in two parts).
ISMA, "ISMA Encryption and Authentication, Version 1.1, AREA / Task Force: DRM", Internet Streaming Media Alliance, Sep. 15, 2006, pp. 1-64.
ITU-T, "Series J: Cable Networks and Transmission of Television, Sound Programme and Other Multimedia Signals", Technical method for ensuring privacy in long-distance international MPEG-2 television transmission conforming to ITU-T J.89, ITU-T Recommendation J.96, Mar. 2001, 34 pgs.
Kabir, "Scalable and Interactive Multimedia Streaming Over the Internet", Thesis, 2005, 207 pgs.
Krikor et al., "Image Encryption Using DCT and Stream Cipher", European Journal of Scientific Research, Jan. 2009, vol. 32, No. 1, pp. 44-58.
Lian et al., "Recent Advances in Multimedia Information System Security", Informatica, Jan. 2009, vol. 33, pp. 3-24.
Lian et al., "Selective Video Encryption Based on Advanced Video Coding", PCM, Nov. 2005, Part II, LNCS 3768, pp. 281-290.
Lievart, "Characteristics that differentiate CA Systems", Irdeto access, Nov. 2001, 5 pgs.
Lloyd, "Supporting Trick Mode Playback Universally Across the Digital Television Industry", Thesis, 2005, 111 pgs.
Macaulay et al., "Whitepaper—IP Streaming of MPEG-4: Native RTP vs MPEG-2 Transport Stream", Envivio, Oct. 2005, 12 pgs.
Martin et al., "Privacy Protected Surveillance Using Secure Visual Object Coding", IEEE Transactions on Circuits and Systems for Video Technology, Aug. 2008, vol. 18, No. 8, pp. 1152-1162, DOI: 10.1109/TCSVT.2008.927110.
Meyer et al., "Security mechanisms for Multimedia-Data with the Example MPEG-I-Video", SECMPEG, 1992, 10 pgs.
Molavi et al., "A Security Study of Digital TV Distribution Systems", Thesis, Jun. 2005, 112 pgs.
Nelson, "The Data Compression Book", M&T Publishing, 1992, 533 pgs., (presented in two parts).
OIPF Open Forum, "OIPF Release 1 Specification, vol. 3, Content Metadata", OIPF, Oct. 8, 2009, vol. 1.1, 47 pgs.
OIPF Open Forum, "OIPF Release 1 Specification, vol. 7—Authentication, Content Protection and Service Protection", OIPF, Oct. 8, 2009, vol. 1.1, 88 pgs.
Oliveira et al., "Dynamic Generation of FMIL-Based Multimedia Interfaces", Journal of Multimedia, Oct. 2008, vol. 3, No. 4, pp. 14-25.
Open IPTV Forum, "Functional Architecture", Jan. 16, 2008, vol. 1.1, 141 pgs.
Open IPTV Forum, "OIPF Release 1 Specification, vol. 1—Overview", OIPF, Oct. 8, 2009, vol. 1.1, 48 pgs.
Open IPTV Forum, "OIPF Release 1 Specification, vol. 2, Media Formats", OIPF, Oct. 8, 2009, vol. 1.1, 22 pgs.
Park et al., "An Efficient Encryption and Key Management Scheme for Layered Access Control of H.265/Scalable Video Coding", IEICI Trans. Inf. & Syst., May 2009, vol. E92-D, No. 5, pp. 851-858, DOI: 1031587/transinf.E92.D.851.
Park et al., "Combined Scheme of Encryption and Watermarking in H.264/Scalable Video Coding", New Directions in Intelligent Interactive Multimedia, SCI 142, 2008, pp. 351-361.
Qiao et al., "Comparison of MPEG Encryption Algorithms", Comput. & Graphics, 1998, vol. 22, No. 4, pp. 437-448.
Raju et al., "Fast and Secure Real-Time Video Encryption", Sixth Indian Conference on Computer Vision, Graphics & Image Processing, Jan. 2009, pp. 257-264, doi:10.1109/ACVGIP.2008.100.
Senoh et al., "DRM Renewability & Interoperability", IEEE Xplore, Conference: Consumer Communications and Networking Conference, 2004, Feb. 2004, pp. 424-429, DOI: 10.1109/CCNC.2004.1286899, Conference: Consumer Communications and Networking Conference, 2004. CCNC 2004. First IEEE.
Shojania et al., "Experiences with MPEG-4 Multimedia Streaming", CiteSeer, Jan. 2001, 3 pgs., DOI: 10.1145/500141.500221.
Symes, "Video Compression Demystified", McGraw-Hill, 2001, 353 pgs., (presented in two parts).
Taymans et al., "GStreamer Application Development Manual (1.6.0)", 2007, 159 pgs.
Thomas et al., "A Novel Secure H.264 Transcoder Using Selective Encryption", Proceedings in International Conference on Image Processing, Jan. 2007, vol. 4, pp. IV-85-IV-88, DOI: 10.1109/ICIP.2007.4379960.
Tosun et al., "Efficient multi-layer coding and encryption of MPEG video streams", 2000 IEEE International Conference on Multimedia and Expo. ICME2000. Proceedings. Latest Advances in the Fast Changing World of Multimedia (Cat. No. OOTH8532), July 30-Aug. 2, 2000, pp. 119-122, DOI: 10.1109/ICME.2000.869559.
Um, "Selective Video Encryption of Distributed Video Coded Bitstreams and Multicast Security over Wireless Networks", Thesis, Aug. 2006, 142 pgs.
Wang, "Lightweight Encryption in Multimedia", Thesis, Jun. 2005, 184 pgs.
Wong, "Web Client Programming with Perl", 1997, printed Jan. 8, 2021 from: https://www.oreilly.com/openbook-webclientch03.html, 31 pgs.
Wu, "A Fast MPEG Encryption Algorithm and Implementation of AES on CAM", Thesis, Oct. 6, 2003, 91 pgs.
Yuksel, "Partial Encryption of Video for Communication and Storage", Thesis, Sep. 2003, 78 pgs.

* cited by examiner

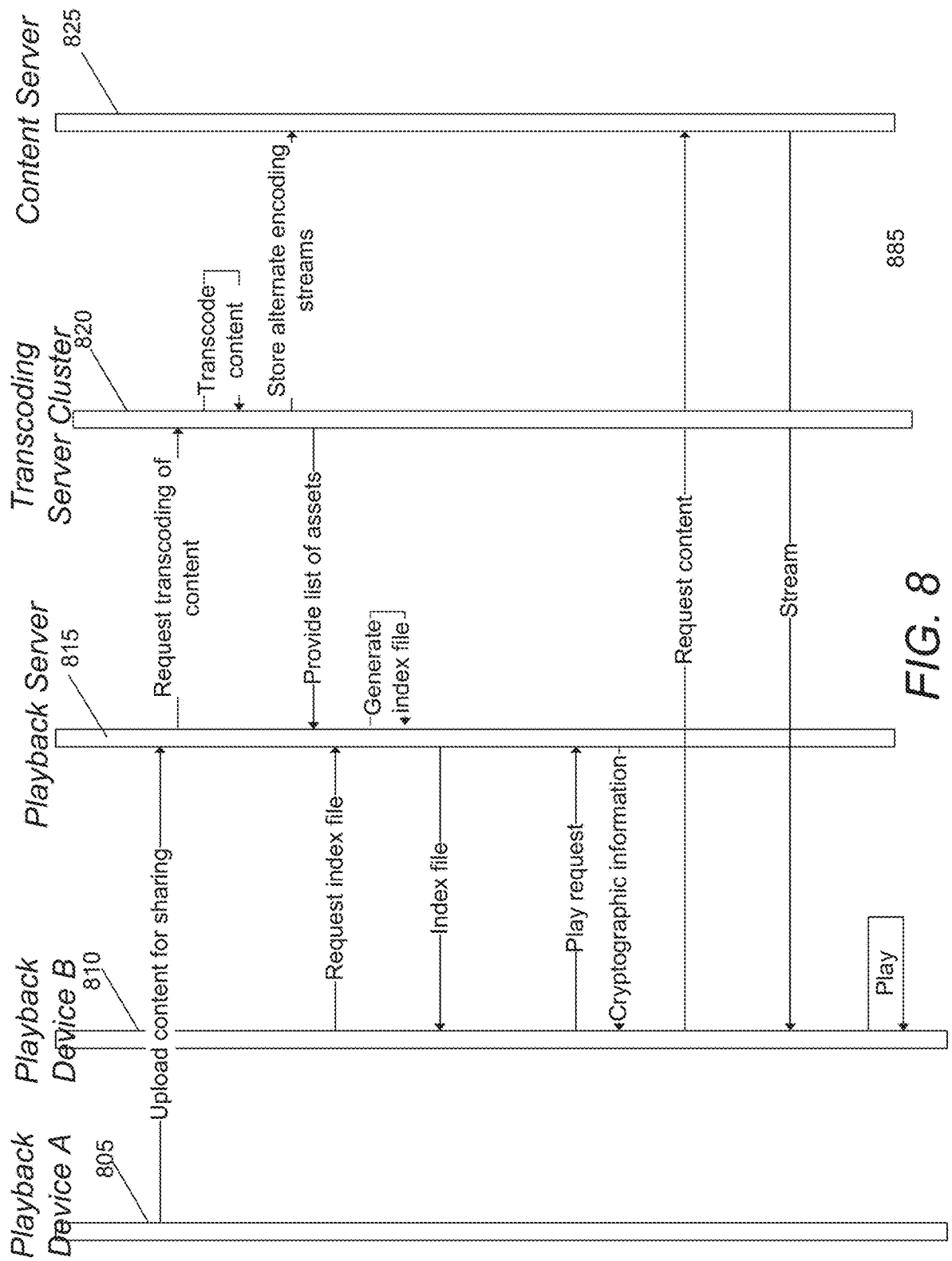

SYSTEMS AND METHODS FOR ENCODING AND SHARING CONTENT BETWEEN DEVICES

CROSS REFERENCE TO RELATED APPLICATIONS

This application is a continuation of U.S. patent application Ser. No. 16/847,363 entitled "Systems and Methods for Encoding and Sharing Content between Devices" to Cen et al., filed Apr. 13, 2020, which is a continuation of U.S. application Ser. No. 16/292,036 entitled "Systems and Methods for Encoding and Sharing Content between Devices" to Cen et al., filed Mar. 4, 2019 and issued on Apr. 14, 2020 as U.S. Pat. No. 10,623,458, which is a continuation of U.S. application Ser. No. 14/989,551 entitled "Systems and Methods for Encoding and Sharing Content between Devices" to Cen et al., filed Jan. 6, 2016 and issued on Mar. 5, 2019 as U.S. Pat. No. 10,225,298, which claims priority to U.S. Provisional Application 62/100,299 entitled "Systems and Methods for Encoding and Sharing Content between Devices" to Cen et al., filed Jan. 6, 2015, the disclosures of which are incorporated herein by reference in their entireties.

FIELD OF THE INVENTION

The present invention generally relates to sharing content with devices with different capabilities and more specifically to transcoding a content file into one or more different encodings and generating, based on a playback device's capabilities, an index file of the alternate encodings for use in playback of the encoded content on the playback device.

BACKGROUND

Advances in technology have provided users of computing devices with the ability to instantaneously and seamlessly share media content (i.e., photos, videos, documents, among other file types) between different devices of a user and/or different users (e.g., friends and family) with many different technology companies providing various platforms for engaging in such activities. For example, social media has permitted the instantaneous sharing of photos and videos across mobile devices, desktop computers, tablets, and many other types of devices with different video playback capabilities. Other cloud based storage platforms have allowed users to share content by providing, for example, a URL to a location of content to other users with whom they would like to share content. Different services may use different technology implementations to deliver content to users. Technology providers often consider many different factors when implementing a particular content delivery mechanism including, but not limited to, the storage required to store content on a platform, the processing necessary to stream content to different devices, network considerations including bandwidth requirements, and the amount of latency experienced by mobile devices in viewing content. Furthermore, with the rapid progress in the quality of videos available, these considerations become ever more vital when implementing a particular technology standard.

In general, video content may be delivered to user device by streaming and/or downloading. The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the playback device's network bandwidth and video decoding capacity) in real time and adjusting the quality of the streamed media accordingly. Typically, the source media is encoded as separate streams having different maximum bitrates and the playback device or client switches between streaming the different encodings depending on available resources. When a playback device commences adaptive bitrate streaming, the playback device typically starts by requesting portions of media from an initial set of streams. As the playback device downloads the requested media, the playback device can measure the available bandwidth. In the event that the available bandwidth increases or decreases, the playback device can switch to higher or lower bitrate streams.

Adaptive streaming solutions typically utilize Hypertext Transfer Protocol (HTTP), published by the Internet Engineering Task Force and the World Wide Web Consortium as RFC 2616, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

SUMMARY OF THE INVENTION

Systems and method for encoding and sharing content between devices in accordance with some embodiments of the invention are disclosed. In accordance with some embodiments of the invention, media content is shared in the following manner. A content server receives shared media content from a first playback device. The content server obtains a transcoding of the shared media content that includes assets to provide the shared media content in a plurality of alternative streams. The content server then receives a request for the shared media content from a second playback device. The request includes device capability information of the second playback device. The content server generates a top level index file that includes information for assets that can be used to provide the shared media content to the second playback device based upon the device capability information for the second playback device and transmits the top level index file from the content server to the second playback back device.

In accordance with some embodiments, the top level index file is generated in the following manner. The content server retrieves the information about assets that provide the shared media content from a memory storing the assets. The capabilities of the second playback device are determined by the content server from the device capability information and the information about the assets is filtered by the content server based upon the determined capabilities of the second playback device and information for assets that meet criteria for the capabilities of the second playback device are included in the top level index file using the content server.

In accordance with many embodiments, the device capability information provided by the second playback device includes a product identifier for the second playback device and the determining of the capabilities of the second playback device is determined by the content server retrieving the capabilities of the second playback device from a memory that stores the capabilities of a playback device having the product identifier of the second playback device included in the device capability information. In a number of embodiments, the capabilities of the playback second device are included in the device capability information in the request and content server determines the capabilities of the second playback device by obtaining the capabilities from the device capabilities information in the request using the content server.

In accordance with some embodiments of the invention, the assets included in the top level index file are also based upon rules regulating the use of different assets for providing the shared media content that are stored in memory. In accordance with many of these embodiments, the rules regulating the use different assets include at least one rule selected from the rules consisting of: the type of playback device, the playback capabilities of the device, and location of the device, and a requested language.

In accordance with some embodiments, the assets included in the top level index file are also based upon at least one criteria selected from the group of criteria selected from the group consisting of user preferences, and requirements of the content owner.

In accordance with some embodiments, a playback device receives shared content in the following manner. The playback device generates a request for shared media content shared with the playback device by another playback device. The request includes device capability information of the playback device and a token associated with the shared media content that was received from the other playback device. The playback device transmits the request to a content server. In response to the request, the playback device receives a top level index file from the content server. The top level index file includes information for assets that can be used to obtain the particular media content to the device based upon the device capability information for the playback device. The playback device then obtains the media content in playback device using the information in the top index file.

BRIEF DESCRIPTION OF THE DRAWINGS

FIG. 8 conceptually illustrates a communication diagram providing a series of communications between different devices and various server systems for uploading and sharing content to the user devices in accordance with an embodiment of the invention.

DETAILED DESCRIPTION

Figure 1:
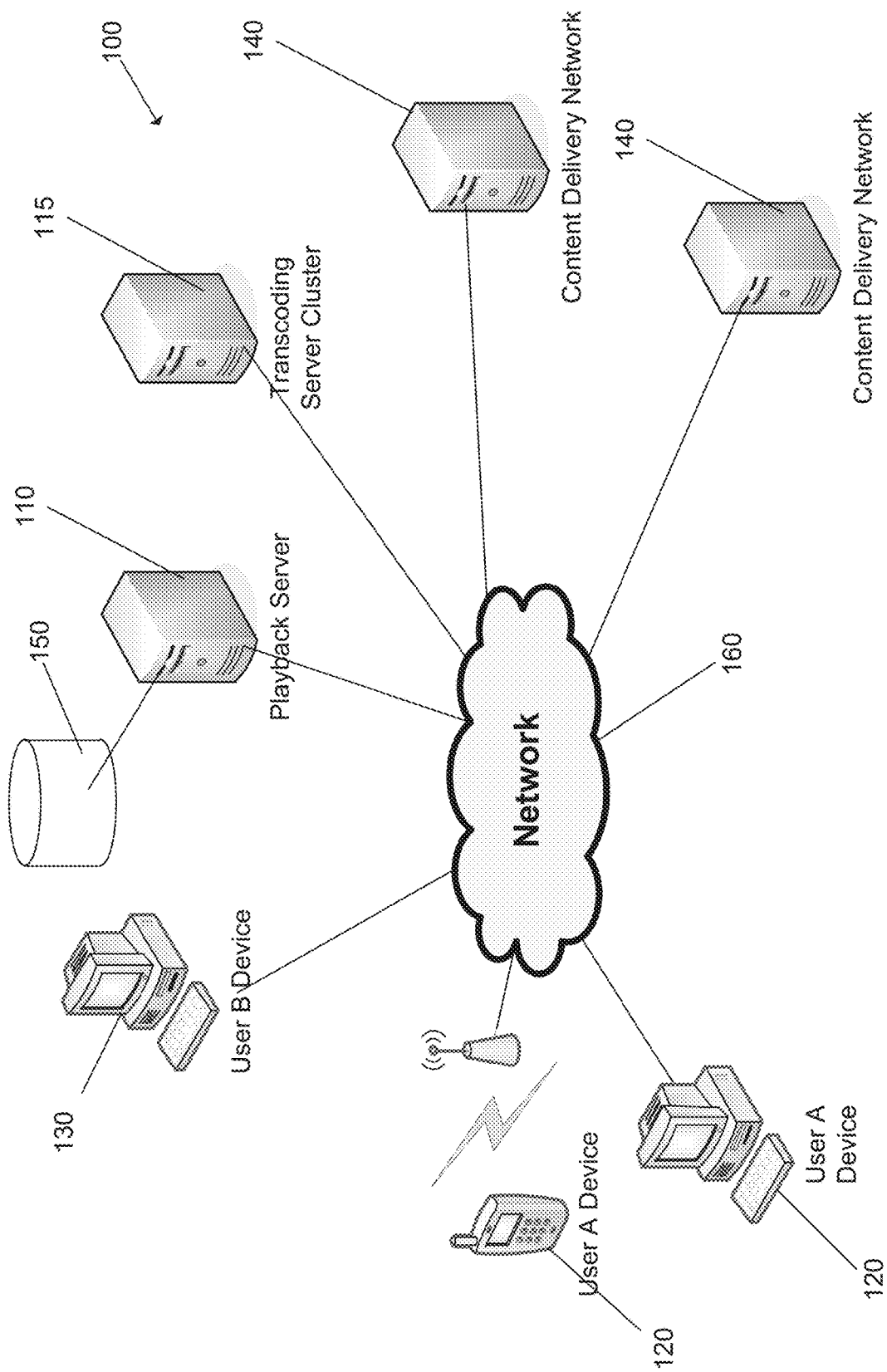
FIG. 1 is a network diagram of a content delivery system including a playback server and a transcoding server in accordance with an embodiment of the invention.

Turning now to the drawings, systems and methods for transcoding an encoded content file into one or more different encodings and generating, based on a device's capabilities, a top level index file of the different encodings for use in playback of the encoded content in accordance with embodiments of the invention are illustrated. In several embodiments, an application on a computing device such as (but not limited to) a mobile phone and/or tablet computer is used to share video content captured and encoded by the computing device. In a number of embodiments, the sharing process involves uploading the encoded video file to a content delivery system that transcodes the encoded content into different encodings for adaptive bitrate streaming to other devices. In many embodiments, the content delivery system controls the distribution of the different encodings to provide secure sharing of the content. The different encodings may be based on the capabilities of the different devices to which a content file will be shared. For example, video content captured in "4K" or "Ultra HD" resolution and that is to be shared with several different devices with different video decoders and playback capabilities may be transcoded using an HEVC codec for the 4K stream and an H.264 codec for an HD (i.e., 1080p) stream. Similarly, the content delivery system can generate different top level index files for different devices to which the content file will be shared based on the particular capabilities of each of the devices. In particular, for a device capable of playing back the 4K encoded stream, the top level index file provided to the device may include information about both the available HEVC and H.264 encodings of the content file. By contrast, for a device that is not capable of playing back the 4K HEVC stream, the top level index file provided to that device may only include information for obtaining the HD H.264 stream. In some embodiments, a content file may be transcoded into several different encoding standards (e.g., H.265/MPEG-H HEVC, H.264/MPEG-4 AVC, H.263/MPEG-4 Part 2, H.262/MPEG-2, Google™ (On2) codecs, Microsoft™ codecs) in order to allow for the content to be shared with devices with different playback capabilities (e.g., encoding/decoding capabilities, resolution, network bandwidth) and/or various other requirements. The specific codecs that are utilized are typically dependent upon the requirements of a specific application.

A top level index is a file that describes the location and content of container files containing different encodings (e.g., H.265/MPEG-H HEVC, H.264/MPEG-4) of media (e.g. audio, video, metadata, and subtitles) that can be utilized by the playback device to stream and playback content. In adaptive bitrate streaming systems, the top level index file typically references the alternative encodings of a content file that the playback device can switch between. In many embodiments, a top level index file is generated in response to a request from a playback device for a content file. For example, a playback device A may share a video file with a playback device B and the top level index file may be generated upon the playback device B requesting playback of the content.

In several embodiments, the process of generating the top level index file involves determining all of the different encodings or container files containing streams associated with a specific piece of content and then filtering the assets based upon one or more predetermined criterion and/or capabilities of a device. In a number of embodiments, the assets are filtered based upon predetermined criteria including (but not limited to) business rules defined by the content owner, device capabilities of the user's with whom the content will be shared, and/or information associated with a user account. In many embodiments, the top level video file that is generated is a SMIL file. In certain embodiments, the top level index file is an MPD file used within the MPEG-DASH standard. In other embodiments, any of a variety of file formats can be utilized to generate top level index files in accordance with embodiments of the invention.

In several embodiments, a playback server automatically generates one or more top level index files, each index file for a particular device with whom a content file is to be shared, in response to a request from a playback device to share the content file with the plurality of different user devices and the playback server can also provide the different devices with cryptographic information enabling playback of protected streams of content. Playback devices, playback servers and processes for transcoding content into different encoding assets for sharing with different users and/or devices and generating top level index files in response to requests from playback devices in accordance with embodiments of the invention are discussed further below.

Content Delivery System Architecture

Content delivery systems in accordance with many embodiments of the invention include a playback server that transcodes a content file that is to be shared to different devices into a plurality of different encoding streams. When devices request playback of the content, the content delivery system can automatically generate top level index files in response to the requests and based upon the different capabilities of the playback devices. A content delivery system in accordance with an embodiment of the invention is illustrated in FIG. 1. The content delivery system 100 includes a number of playback devices 120-130, including user A devices 120 and user B device 130, configured to upload content for sharing with other user devices and/or request playback (e.g., streaming and/or downloading) of content from remote servers within content delivery networks (CDNs) 140 via a network 160 such as the Internet. In order to stream content for sharing, a playback device obtains a top level index file that is automatically generated by the playback server 180 for the particular device using a database 150 of available assets (i.e. container files containing streams of content associated with specific titles) and a set of predetermined filters or criteria based on the capabilities of the particular playback device.

In many embodiments, a playback device may perform adaptive bitrate streaming by selecting content from different alternative streams described in the top level index file based upon identifying information provided by the playback device. Systems and methods for adaptive bitrate streaming using automatically generated top level index files are described in U.S. patent application Ser. No. 13/341,789 to Shaifer et al., entitled "Systems and Methods for Automatically Generating Top Level Index Files", filed Dec. 30, 2011 and issued as U.S. Pat. No. 8,787,570. The disclosure of U.S. Pat. No. 8,787,570 is incorporated by reference herein in its entirety.

The playback server 110 may obtain a content file from a user device 120-130 and use the transcoding server cluster 115 to transcode the encoded content file into one or more alternative streams that use different encoding standards. The transcoded content files may be stored in the asset storage 150 database of available assets (i.e. container files containing different streams of encoded content associated with specific titles). As described above, alternative streams (or alternative encoded assets) are streams that encode the same media content in different ways. In many instances, alternative streams encode media content (such as but not limited to video) using different encoding standards (e.g., HEVC or H.264) and/or encode the content at different maximum bitrates. In a number of embodiments, the alternative streams are encoded with different resolutions and/or at different frame rates. In many embodiments, the top level index file generated by the playback server 180 for a particular playback device describes at least the maximum bitrates of each of the alternative streams. The playback device can select one or more streams for conventional streaming or can switch between alternative streams to perform adaptive bitrate streaming.

In several embodiments, when one playback device 120-130 shares a piece of content with another playback device, the playback device 120-130 receives the shared content by way of a token that can be provided to the playback server 110 to stream and/or download the content. When a playback device transmits the token to server 110, the playback device 120-130 can append information describing playback capabilities of the playback device 120-130 that the playback server 110 can utilize to automatically generate a top level index file for the playback device 120-130 using information stored in database 150. The playback server 110 is typically a conventional server system configured using a playback management application and in such a way that the playback server can access the database 150. In a number of embodiments, playback devices 120-130 provide information concerning their playback capabilities to the playback server 110 and the server 110 automatically generates top level index files by filtering assets associated with a shared piece of content based upon device capabilities. Such capabilities include, but are not limited to, playback capabilities, encoding/decoding codec, display aspect ratio, and/or anticipated maximum network connection data rate. In a number of embodiments, the capabilities of a specific playback device 120-130 are communicated to the playback server 110 in the form of a product identifier or product ID. The playback server 110 can maintain a database of product IDs and associated device capabilities, and can utilize the product IDs provided by playback devices to retrieve the associated device capabilities and apply filters to lists of available assets when generating a top level index file. Systems and methods for assigning product IDs and associating them with information concerning the capabilities of the devices to which the product IDs are assigned are described in U.S. Provisional Publication No. 2013/0006869 to Grab et al., entitled "Method to Identify Consumer Electronics Products", filed Mar. 31, 2012. The relevant disclosure from U.S. Provisional Publication No. 2013/0006869 related to using product identifiers to identify the playback capabilities of specific devices is incorporated by reference herein in its entirety. Other filters that can be applied by playback servers in accordance with embodiments of the invention include (but are not limited to) filters based upon the location of the playback device (i.e. country/region), and languages associated with a specific user. Various filters that can be applied to generate a top level index file in accordance with embodiments of the invention are discussed further below.

In several embodiments, the shared content is further secured through the use of encryption and digital rights management (DRM) technology. When the playback server 110 receives a request from a playback device 120-130 to playback encrypted content, the playback server retrieves cryptographic information required to playback protected streams of content. The playback device can then request portions of container files containing streams of content from one or more servers within a content delivery network 140 and can use the cryptographic information to access protected content. Systems and methods for the digital rights management of protected streams used in adaptive bitrate streaming are described in U.S. Pat. No. 8,909,922 to Kiefer et al., entitled "Systems and Methods for Playing Back Alternative Streams of Protected Content Protected Using Common Cryptographic Information". The disclosure of U.S. Pat. No. 8,909,922 is incorporated by reference herein in its entirety.

Although a specific content delivery system is illustrated in FIG. 1, playback servers that transcode an encoded content file into alternative streams and automatically generate top level index files based on device capabilities can be incorporated into any of a variety of content delivery system architectures in accordance with some embodiments of the invention. Playback devices that can be utilized to playback content in accordance with some embodiments of the invention are discussed further below.

Playback Devices

Figure 2:
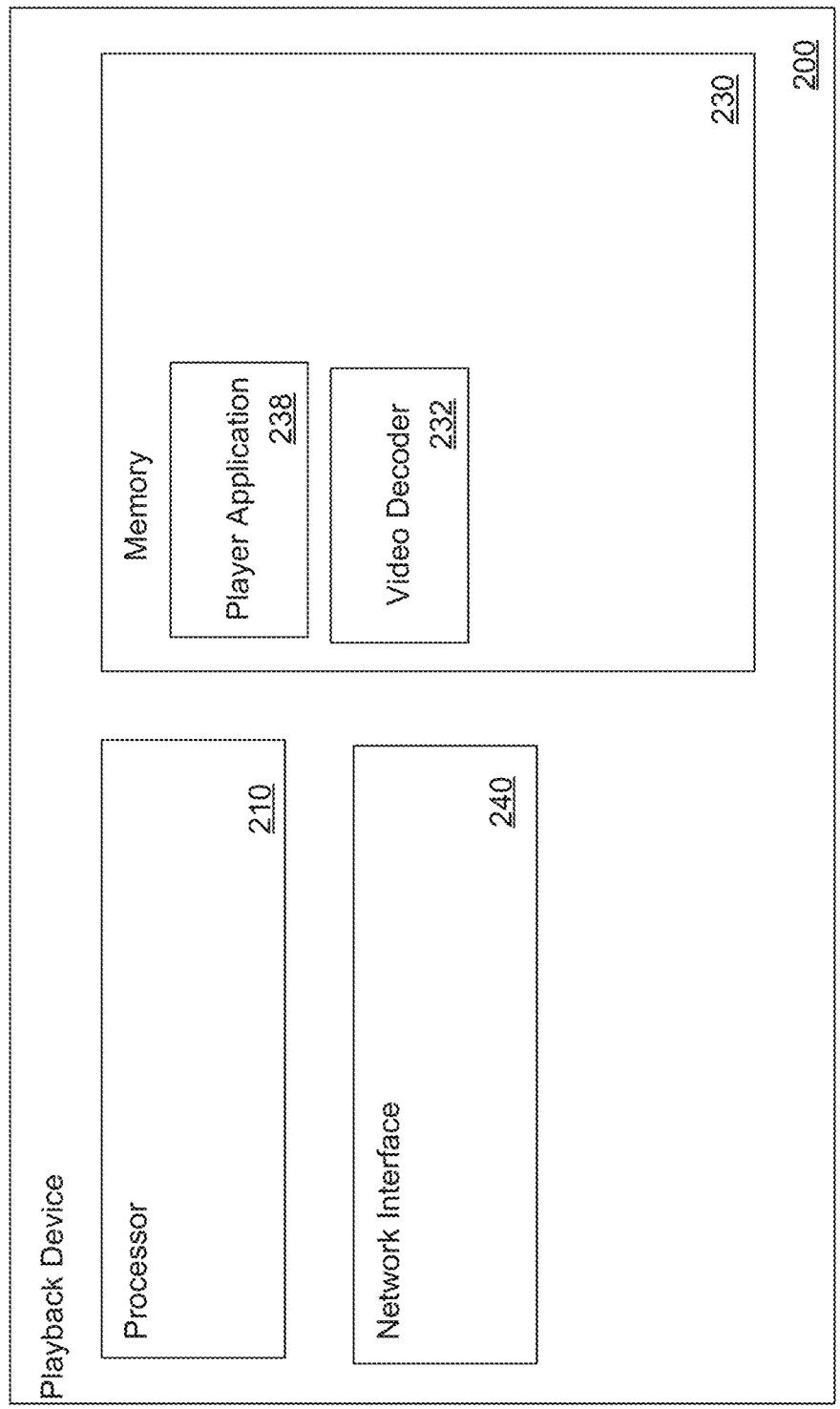
FIG. 2 is a system diagram of a playback device in accordance with an embodiment of the invention.

Playback devices that can be utilized to securely share content in accordance with embodiments of the invention can include personal computers, CE players, and mobile phones. In many embodiments, playback devices can include consumer electronics devices such as DVD players, Blu-ray players, televisions, set top boxes, video game consoles, tablets, and other devices that are capable of connecting to a server and playing back encoded media. The basic architecture of a playback device in accordance with an embodiment of the invention is illustrated in FIG. 2. The playback device 200 includes a processor 210 in communication with memory 230 and a network interface 240. In the illustrated embodiment, the memory includes a player application 238 that configures the processor and the playback device to request content from a playback server. In some embodiments, the player application 238 may request the content be streamed and/or downloaded to the playback device 200. The memory 230 also includes a video decoder 232 that can decode encoded video for playback. Different devices may include software and/or hardware with different encoders/decoders (i.e., "codecs") for decoding content. For example, for a playback device capable of playing back 4K video, the decoder may be an HEVC decoder. For a playback device capable of playing back HD (i.e., 1080p) video, the decoder may be an H.264 decoder. In many embodiments, the playback device may include multiple decoders to support different media formats.

During operation, a player application 238 can configure the playback device 200 to upload content to the playback server for sharing with one or more other playback devices. When content is shared with the playback device 200, the player application 238 may configure the playback device 200 to request a top level index file from a playback server. As noted above, the request for a top level index file can include the product ID of the playback device, which can be used to filter the assets that are described in the top level index file. When the top level index file is received from the playback server, the player application 238 can configure the playback device to store the top level index file in memory 230. In some embodiments where content is encrypted, the player application 238 may request cryptographic information to playback requested streams from the playback server (or a separate DRM server) in response to a user instruction to playback content and the cryptographic information received from the playback server can also be stored in memory 230. The player application 238 configures the playback device 200 to playback content by requesting portions of container files containing content from a server within a content delivery network. The specific container files selected by the player application 238 can be determined based upon the information available to the player application within the top level index file and the streaming conditions experienced by the playback device. When the playback device receives the requested portions of the container files and the content is encrypted, the player application 238 can access protected content within the requested portions of the container files using the content cryptographic information. The player application 238 can continue to request and playback content from different container files depending upon the prevailing streaming conditions until a user instruction suspending playback is received or until playback completes.

Although various playback devices are described above with reference to FIG. 2, any of a variety of architectures including architectures where the player application is located on disk or some other form of storage and is loaded into memory at runtime can be utilized to implement playback devices for use in content delivery systems in accordance with some embodiments of the invention. Furthermore, any of a variety of system architectures including (but not limited) to the system architecture illustrated in FIG. 1 can be utilized to transcode content and deliver content using top level index files that are automatically generated in response to requests from playback devices in accordance with some embodiments of the invention.

Playback Server

Figure 3:
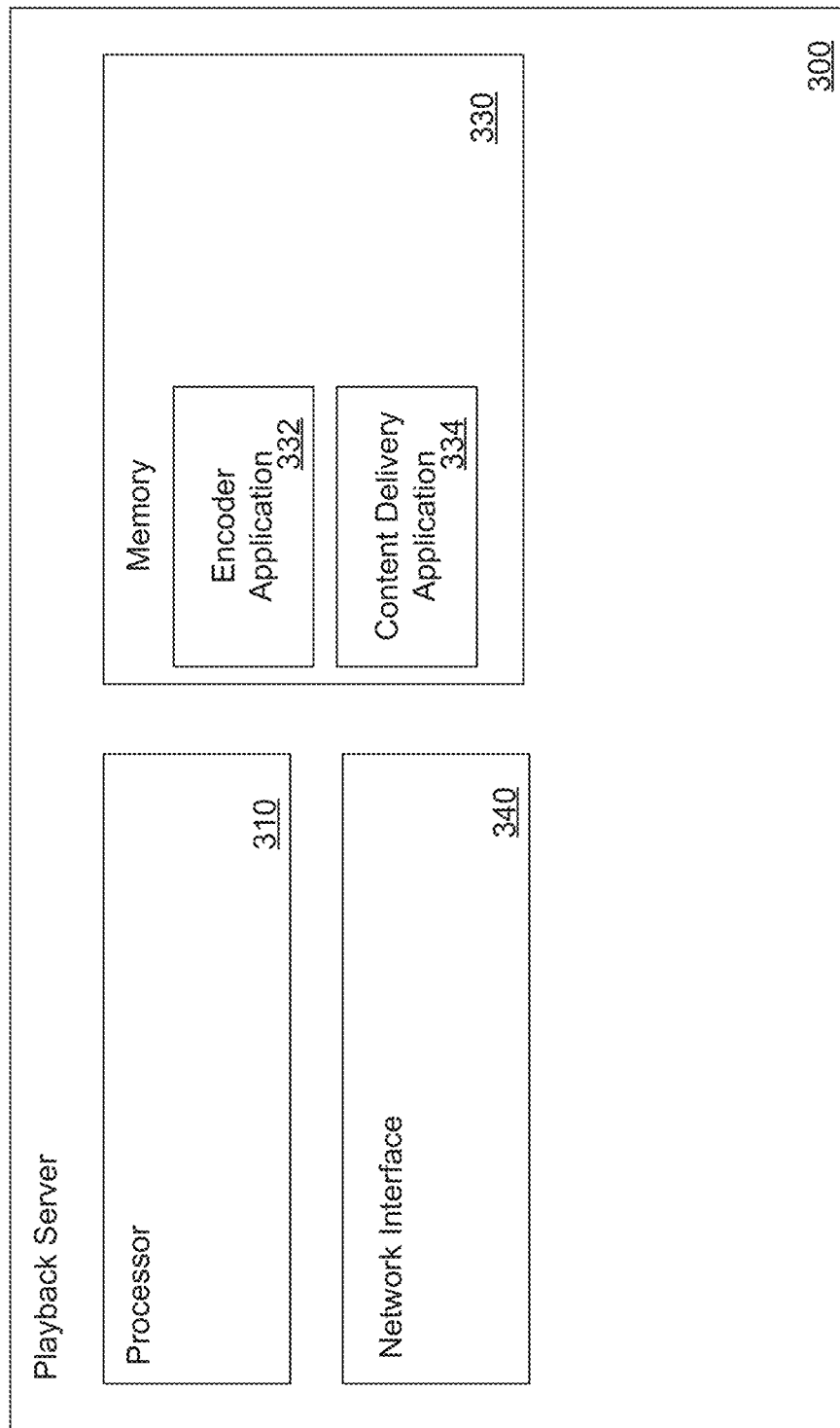
FIG. 3 is a playback server configured to deliver content to a plurality of different devices in accordance with an embodiment of the invention.

In many embodiments, a user playback device may communicate with a playback server to upload content for sharing with a plurality of other devices and/or to obtain access to the content. A playback server configured to deliver content to a plurality of different devices in accordance with an embodiment of the invention is shown in FIG. 3. The playback server 300 includes a processor 310, a network interface 340, and a memory 330. In the illustrated embodiment, the memory 330 includes an encoder application 332 and a content delivery application 334. As discussed above, the playback server can be configured by the encoder application software 332 to encode and/or transcode a content file into one or more alternative streams each providing a different encoding of the content file (e.g., HEVC, H.264, among various others). In accordance with some embodiments, the encoder application 332 communicates with one or more transcoder server clusters (not illustrated) in order to transcode a content file into the different alternative encoding streams.

The playback server can be configured by the content delivery application 334 to generate a top level index file for a playback device and/or deliver content to the playback device. In some embodiments, the top level index file is generated and/or selected based on the capabilities of the particular playback device requesting playback of content, including the video encoding/decoding capabilities of the device.

Although a specific playback server architecture is illustrated in FIG. 3, any of a variety of architectures that are capable of managing interactions with user devices to deliver content in the manner outlined above can be utilized in accordance with some embodiments of the invention.

Content Transcoding and Delivery Architecture

Figure 4:
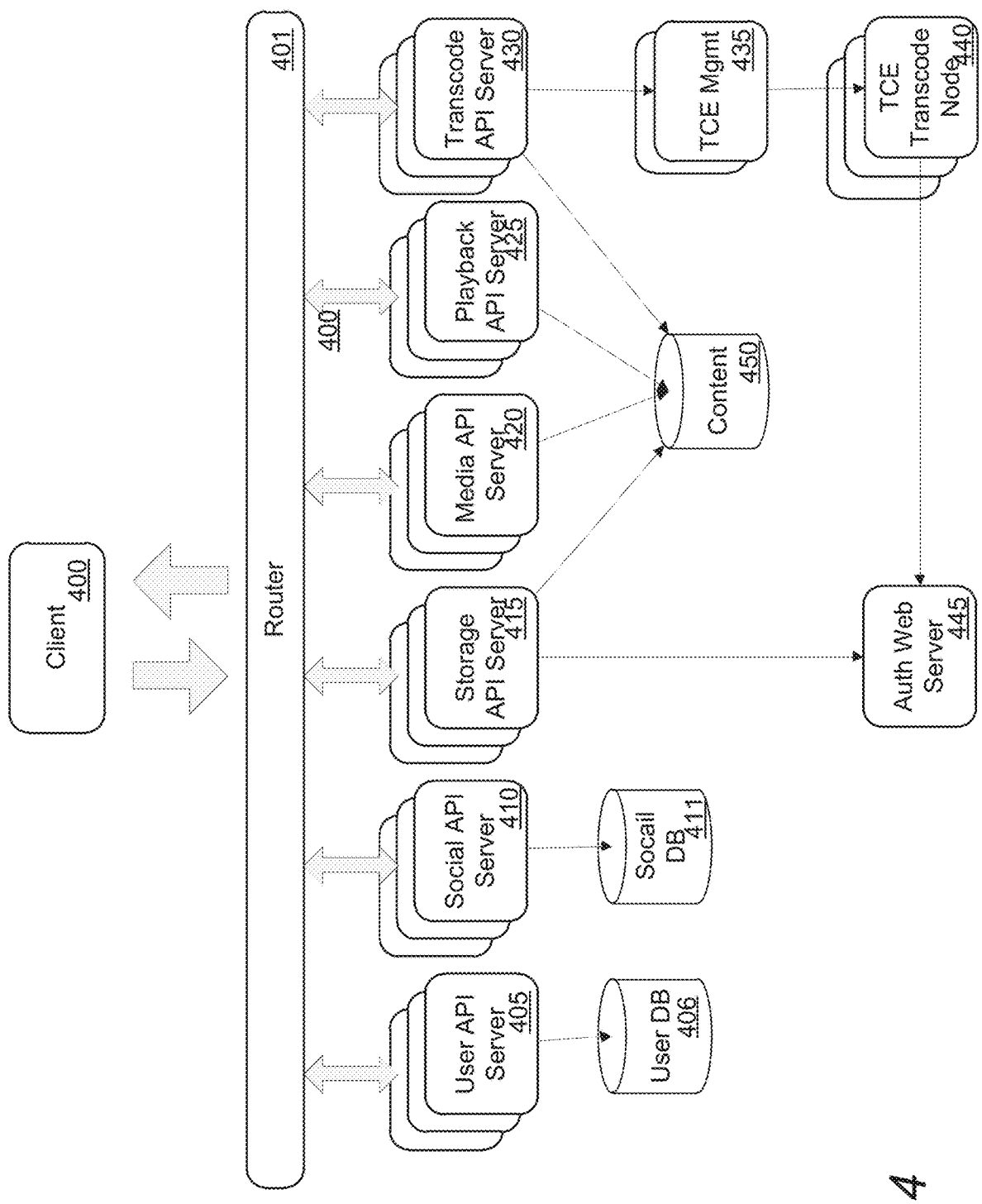
FIG. 4 is an architecture diagram of a content transcoding and delivery system in accordance with an embodiment of the invention.

When a user device uploads encoded content for sharing with different devices, the system may transcode the encoded content into different encoding formats in order to allow for the playback of the content on devices with different playback capabilities. An example system architecture of a content transcoding and delivery system in accordance with an embodiment of the invention is illustrated in FIG. 4. As illustrated a client device 400 communicates through a router 401 with a server system via various server APIs 405-430 (application programming interfaces), including the user API server 405, social API server 410, storage API server 415, media API server, playback API server, and transcode API server. The user API server 405 may receive user and/or device information from a client 400 and may store the information within the user database 406. The social API server may receive social media information from the client 400 and store this information in the social database 411. The storage API server 415 manages the storage of content stored within the content database 450. The storage API server may receive content from the client 400, the playback API server, and/or the transcode API server for storing in the content database 450. The media API server 420 may communicate with player applications requesting content stored in the content database 450. The playback API server may manage the playback of content stored within the content database 450. The transcode API server may manage the transcoding of content, including receiving an encoded content file and transcoding it into one or more different encoding streams for storage within the content database 450.

In order to transcode content, the transcode API server 430 may communicate with a TCE management application 435 that manages the transcoding operations taking place. The TCE management application 435 may be used for distributed coordination of the transcoding jobs, including tracking progress of a job and reporting machine load. The machine load information may be used to implement load balancing schedulers.

Each transcoding operation, illustrated as a TCE transcode node 440 may be a process that decodes and re-encodes content into one or more different encoding standards. The TCE transcode node 440 may utilize an authorization web server 445 to communicate with the storage API server for storing the alternative streams within the content database 450.

Although a specific content delivery architecture is illustrated in FIG. 4, any of a variety of architectures that are capable of managing interactions with client devices to deliver content in the manner outlined above can be utilized in accordance with some embodiments of the invention.

Sharing and Transcoding Content

Figure 5:
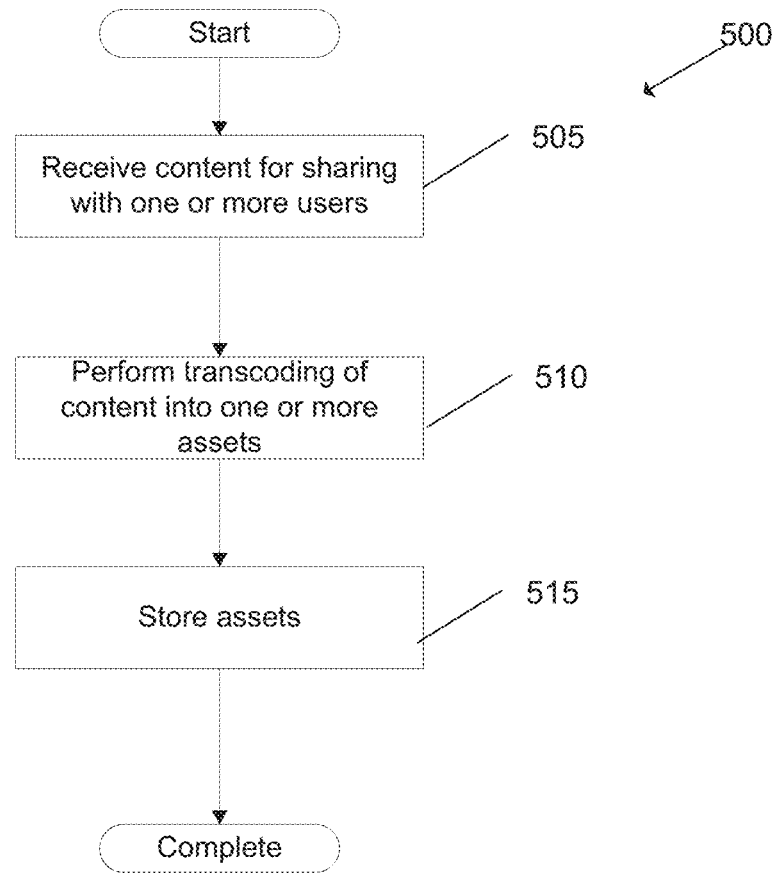
FIG. 5 conceptually illustrates a process for uploading and transcoding content for sharing with one or more different user devices.

As described above, a client device may upload encoded content to a playback server for sharing with one or more other devices of the user and/or different users. A process for uploading content for sharing with different devices in accordance with an embodiment of the invention is illustrated in FIG. 5. The process 500 receives (505) content for sharing with one or more devices. In some embodiments, the content is received from a playback device of a user. The content may be an encoded video file, encoded using a particular encoding standard (e.g., HEVC, H.264, among others).

The process performs (510) transcoding of the content into one or more different alternative encoding streams. In some embodiments, the process encodes the content into different streams based on the playback capabilities of the devices to which the content is or will be shared. For example, if a user uploads a 4K video to be shared with devices that have 4K playback and several devices that do not have 4K playback capacity (e.g., have only H.264 decoders), the process may transcode the content into both HEVC and H.264.

In accordance with some other embodiments, the process transcodes the content into a set list of alternative encodings and/or formats. For example, video content may be transcoded into several of the most prevalent encoding standards (e.g., HEVC, H.264, Microsoft™ codecs, Google™ codecs, among others) being used by devices. For example, content may be encoded using H.264/AVS to provide compatibility with the majority of devices. Thus, when a playback device requests playback of a content file, the process may provide a top level index file with a list of assets that the playback device will be capable of playing back. As described below, the top level index file may be specific to the playback device and include only those assets corresponding to encoded streams that the playback device is capable of playing back.

In accordance with some embodiments, the process begins transcoding (i.e., "pre-transcoding") a content file into different encoding formats upon the content file being uploaded from a playback device (and prior to the different playback devices requesting the content file). In accordance with a number of certain embodiments, the process may transcode the content file into a particular encoding format upon receipt of a request for playback from a playback device. For example, the process may automatically transcode the content file into the most popular encoding formats (e.g., HEVC and H.264), but wait to transcode the content file into a less popular encoding format upon receiving a request from a playback device that requires the particular encoding format. The process may concurrently transcode and stream the content to the playback device using various "live transcoding" servers that can run several transcoding processes in parallel while serving a device's playback requests.

The process stores (515) the assets. The process then completes. Although a specific process is illustrated in FIG. 5, any of a variety of processes can be utilized for transcoding a content file in accordance with embodiments of the invention. Playback servers and processes for automatically generating index files in accordance with embodiments of the invention are described below.

Content Playback

Figure 6:
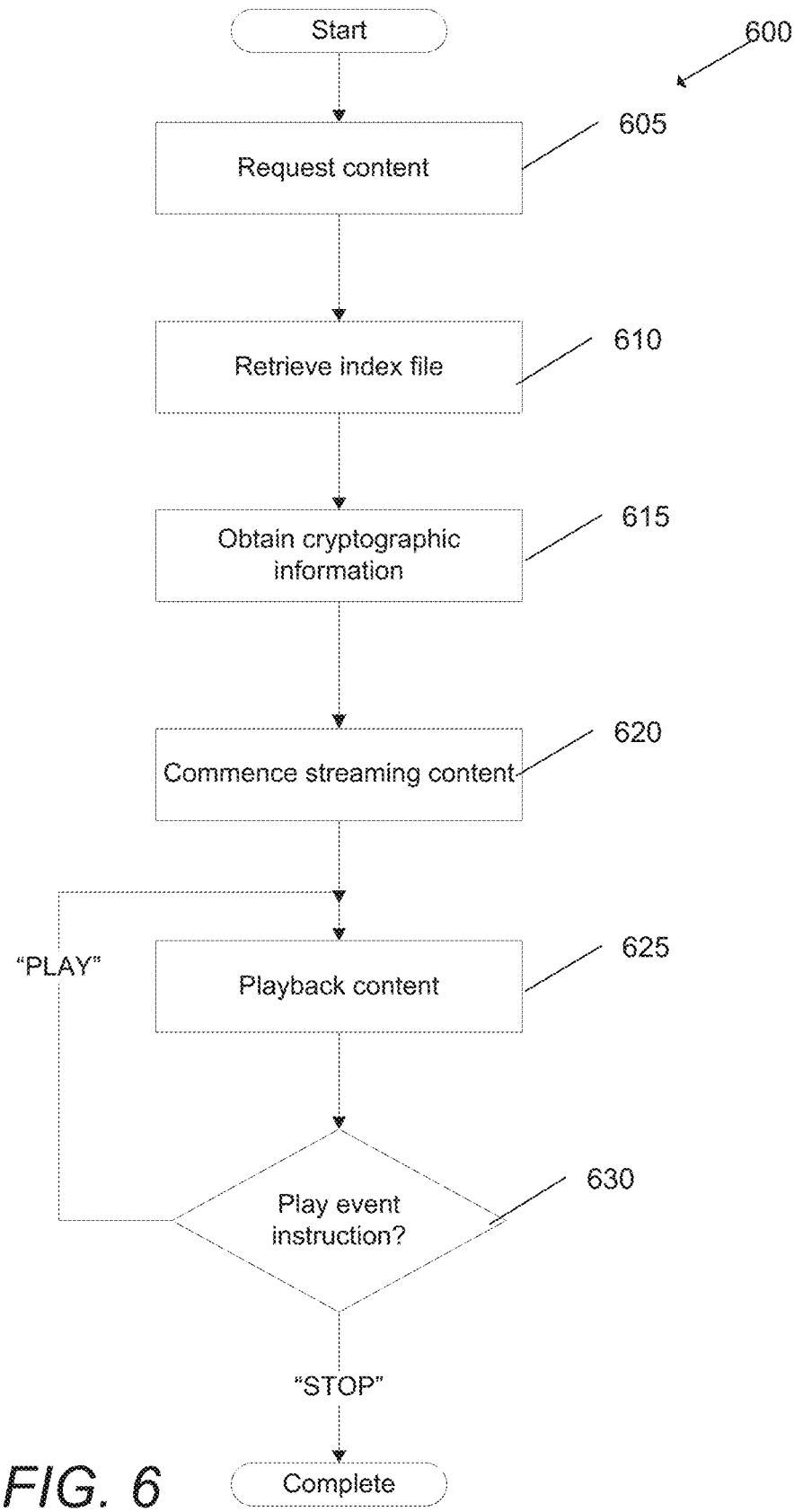
FIG. 6 conceptually illustrates a process for playing back content using a top level index file generated in response to a request from a playback device in accordance with an embodiment of the invention.

A process for playing back content using a top level index file generated in response to a request from a playback device in accordance with an embodiment of the invention is illustrated in FIG. 6. The process 600 includes requesting (605) content. The request can be performed using a playback device or can be performed using another device. In order to access the content, the playback device provides a request that prompts the generation of a top level index file customized for the specific playback device from a playback server. In accordance with several embodiments, the request takes the form of a token indicating that the playback device is authorized to request the content and the playback device provides a product identifier to the remote server via an API. In accordance with some other embodiments, any of a variety of techniques for requesting content can be utilized as appropriate to the requirements of specific applications. In accordance with many embodiments, the top level index file is customized in the sense that the playback server filters all available assets to generate a top level index file that describes the assets that are available and/or best suited to playback by the playback device. Once the custom top level index file is retrieved (610), the playback device obtains (615) cryptographic information that enables playback of protected streams identified within the top level index file. In accordance with many embodiments, playback devices wait until a playback request is received from a user and then requests cryptographic information from the playback server.

When a playback device possesses a top level index file and any necessary cryptographic information, the playback device can commence streaming and/or downloading (620) content by requesting portions of one or more container files containing encoded media. Any of a variety of processes can be utilized to select initial streams including (but not limited to) selecting the lowest bitrate streams, performing a bandwidth probe in a manner similar to the manner disclosed in U.S. Patent Publication No. 2013/0007200 to van der Schaar et al., entitled "Systems and Methods for Determining Available Bandwidth and Performing Initial Stream Selection When Commencing Streaming Using Hypertext Transfer Protocol", filed Sep. 30, 2011, or estimating available bandwidth using another technique. The disclosure of U.S. Patent Publication No. 2013/0007200 is incorporated by reference herein in its entirety.

Once playback commences (620), adaptive bitrate streaming can be performed. During playback, play event reports can be provided to a playback server to provide information concerning the playback status of the playback device periodically or in response to various events including (but not limited to) user instructions received by the playback device. When a play event report is provided to the playback server, the playback server can provide a play event instruction to the playback device. In the illustrated embodiment, the play event instructions that can be received (630) by the playback device including a "PLAY" instruction to continue playback and a "STOP" instruction to cease playback. The ability of a playback server to stop playback on a playback device enables the playback device to enforce concurrency requirements across multiple playback devices associated with a user. The combination of the play event reports and the event playback instructions can also be utilized by the playback server to enable a second playback device to resume playback of content at the last playback location reported by a first playback device. In this way, a user can seamlessly move between playback devices without the need to seek to a location to continue playback.

Although a specific process is illustrated in FIG. 6, any of a variety of processes can be utilized for requesting a customized top level index file and playing back content in accordance with embodiments of the invention. Playback servers and processes for automatically generating index files in accordance with some embodiments of the invention are described below.

Automatic Generation of Top Level Indexes

Playback servers in accordance with many embodiments of the invention maintain a database of assets associated with specific pieces of content and can be configured by a playback management application to retrieve and filter information concerning assets to automatically generate a top level index file for a specific playback device. The databases maintained by the playback servers can list the name of the file containing the asset, and the content delivery servers and/or network(s) on which the asset is located. When the asset is a video stream, the database can describe characteristics of the video stream including, but not limited to, the codec of the stream, the maximum bitrate at which the video stream is encoded, the frame rate of the video stream, the resolution and/or sample aspect ratio of the video stream. When the asset is an audio stream, the database can describe characteristics of the audio stream including (but not limited to) the language of the audio stream, the encoding of the audio stream and the bandwidth requirements of the audio stream. When the asset is a subtitle stream, the database can describe characteristics of the subtitle stream including (but not limited to) the language of the subtitle stream, the encoding of the subtitle stream and the bandwidth requirements of the subtitle stream. In addition to maintaining information concerning assets, the playback device can maintain information concerning playback capabilities of playback devices. In accordance with a number of embodiments, the information concerning playback capabilities of different playback devices is indexed using a product ID. In accordance with many embodiments, the playback server also maintains information concerning rules regulating the usage of different assets based upon criteria including (but not limited to) the type of playback device, the playback capabilities of a playback device, the location of the playback device (e.g. country/region), and/or requested language (s). Although specific pieces of information are described above as being associated in a database maintained by a playback server, any of a variety of pieces of information can be maintained in any of a variety of data structures to enable generation of a top level index file by a playback server in accordance with some embodiments of the invention. Furthermore, a playback device can provide a listing of its capabilities directly to the playback server. As is discussed further below, the information maintained by the playback server can be filtered in real time in response to a request for a top level index file from a playback device to generate a top level index file that only includes links to the assets that the playback device is permitted to playback.

Figure 7:
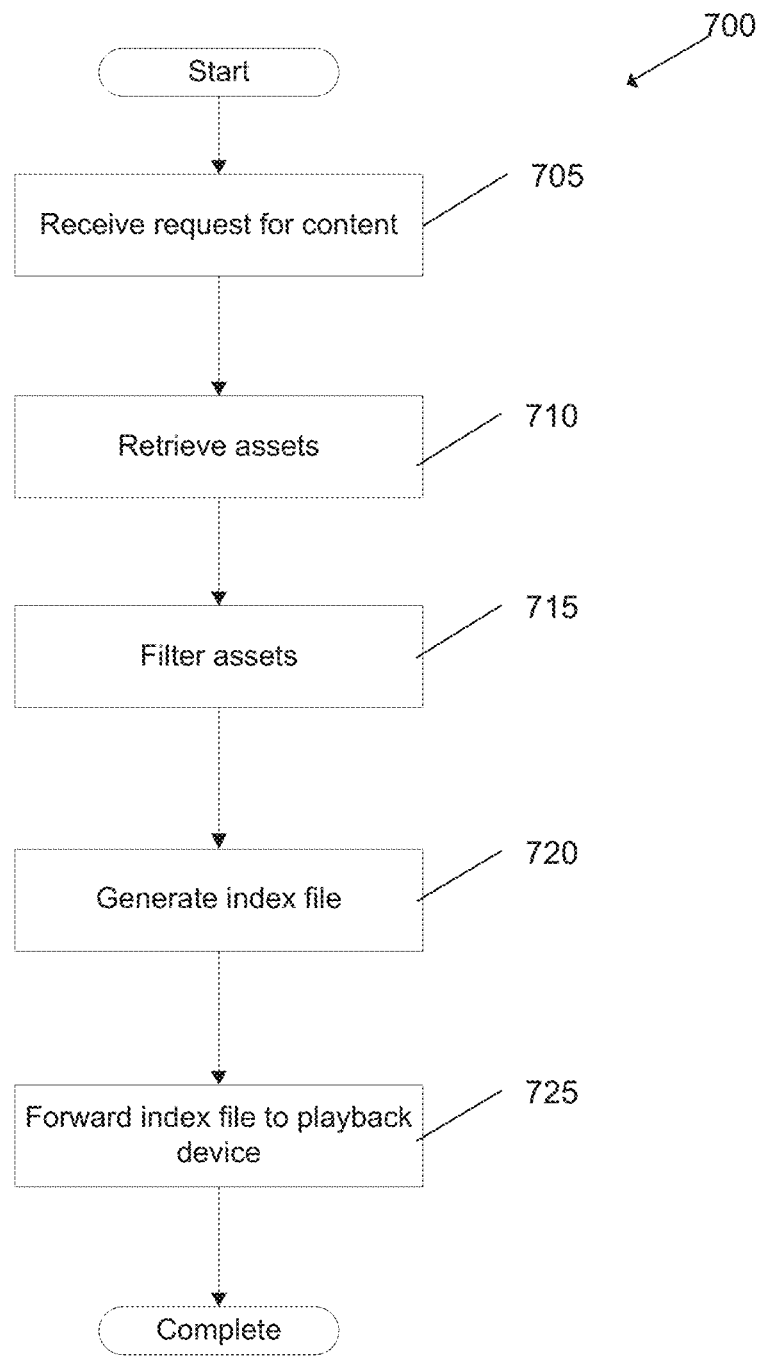
FIG. 7 conceptually illustrates a process for generating a top level index file using information concerning assets associated with specific pieces of content maintained by a playback server in accordance with an embodiment of the invention.

A process for generating a top level index file using information concerning assets associated with specific pieces of content maintained by a playback server in accordance with an embodiment of the invention is illustrated in FIG. 7. In the illustrated embodiment, the process 700 commences when the playback server receives (705) a request for a top level index file with respect to a specific piece of content from a specific playback device. As discussed above, the request can include information describing the playback device including (but not limited to) the playback capabilities of the playback device, a user account to which the playback device is registered, and information indicative of the geographic location of the playback device (e.g. the I.P. address of the playback device). In accordance with many embodiments, the capabilities of the playback device are identified using a product ID, which is associated with specific playback capabilities in a database accessible to the playback server.

The playback server retrieves (710) assets associated with the requested piece of content. The playback server filters (715) the assets based upon one or more filters associated with the capabilities of the playback device, the preferences of the user, and the requirements of the content owner. Accordingly, different top level index files can be generated with respect to the same content dependent on factors including (but not limited to) differences in playback capabilities (e.g., codec, resolution, memory) between devices, differences in geographic location, and/or differences in language preferences associated with the playback devices. For example, if a user uploads a 4K video for sharing, the top level index file for a device capable of playing the 4K video may include the 4K stream while the top level index file for a device that is not capable of playing the 4K video may not include the 4K stream, but rather a stream (e.g., H.264) that the device is capable of playing back.

Following filtering, the remaining assets can be utilized to generate (720) the top level index file, which can be provided (725) to the playback device. In accordance with a number of embodiments, the top level index file is securely forward using a secure communication technique including, but not limited to, Secure Socket Layer (SSL) communication or an equivalent secure communication protocol.

Although a specific process for generating a top level index file in accordance with an embodiment of the invention is illustrated in FIG. 7, any of a variety of processes involving collecting information concerning assets associated with a specific piece of content and generating an index file that indexes the assets that are to be made available to a playback device by a content delivery streaming system can be utilized in accordance with some embodiments of the invention. A communication diagram illustrating the series of communications between playback devices and servers in order to share content in accordance with embodiments of the invention are discussed below.

Communication Between Devices and Servers

Many embodiments of the invention provide for uploading content from user devices for sharing with other devices, transcoding the content into one or more different encoding formats, and generating top level index files of the different encoding formats based on the capabilities of the different devices. In order to facilitate the sharing of the content, the client devices communicate with various different server systems to upload content, transcode content, and/or receive top level index files. An example of communication between client devices and/or the various different server systems in accordance with an embodiment of the invention is illustrated in FIG. 8.

FIG. 8 illustrates the communication between playback devices A 805 and B 810, a playback server 815, a transcoding server cluster 820, and a content delivery server 825. The playback devices 805-810 and different servers 815-825 may communicate with each other over a network such as the Internet. As described above, the playback server 815 may provide an interface accessible to the client devices 805-810 for uploading content (e.g., video files, photos, and/or audio files, among others) via an application on their client devices 805-810. The playback server 815 can be used to receive a content for sharing with one or more devices 805-810, to transcode the content into one or more different encoding formats, to generate top level index files for playback devices, and to deliver content to the playback devices. The playback server 815 may also provide cryptographic information used to access digital content that has been encrypted (e.g., using a DRM server).

The playback server 815 may use one or more transcoding server clusters 820 in order to transcode a content file into one or more different encoding formats and/or store the content within a content server 825.

The content server 825 may provide the content to a client device 805-810 requesting playback of a piece of content. The content can be downloaded and/or streamed by a client device 805-810.

The communications illustrated in FIG. 8 for uploading content from a client device for sharing with one or more other devices may proceed according to the following series of communications. The client device 805 uploads content for sharing to the playback server 815. The content may be a video file encoded according to a particular standard (e.g., H.264 or HEVC for 4K video). Where the playback device has transcoding capabilities, the playback device may also perform transcoding of the video file prior to uploading.

The playback server 815 requests transcoding of the content to the transcoding server cluster 820.

The transcoding server cluster 820 transcodes the content into one or more different alternate encoding streams. The transcoding server cluster 820 stores the alternative encoding streams with the content server 825 and provides a list of the alternative streams to the playback server 815.

A different playback device B 810 may request playback of the content file, and submit a request for a top level index file to the playback server 815 using any of the techniques described above. The playback server 815 may generate a top level index file. In some embodiments, the top level index file is generated based on the playback capabilities of the playback device. In other embodiments, the playback server may select a top level index file from a plurality of index files based on the product ID of the playback device.

The playback server 815 provides the playback device B 810 with the top level index file.

The playback device B 810 may provide a play request to the playback server 815. The playback server 815 provides cryptographic information to the playback device B 810 for decrypting the encoded content.

The playback device B 810 uses the top level index file to request content from the content server 825. The content server 825 provides the content to the playback device 810. The playback device decrypts the content using the cryptographic information in order to playback the content on the device.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method for transcoding a content file into one or more different encodings and generating, based on a device's capabilities, a top level index file of the one or more different encodings for use in playback of the content file, the method comprising:
   receiving the content file for sharing with one or more different devices, the content file received from a first playback device, the content file comprising an encoded video file encoded using a first particular encoding format;

determining one or more capabilities of the one or more different devices to which the content file is to be shared;

transcoding the content file into one or more different encodings based on the one or more capabilities of the one or more different devices to which the content file is to be shared;

generating different top level index files for the one or more capabilities of the one or more different devices to which the content file is to be shared, where:

each top level index file describes a location and content of container files, the container files containing different encodings of media configured to be utilized to stream and playback content; and each top level index file references different encodings of the content file that a corresponding device is configured to switch between during adaptive streaming; and providing one or more encodings of the content file to the one or more different devices using the top level index files.

2. The method of claim 1, wherein the different top level index files are generated in response to requests from the one or more different devices for the content file.

3. The method of claim 2, wherein the requests comprise a product identifier that is used to determine one or more capabilities of the one or more different devices.

4. The method of claim 2, wherein generating the different top level index files comprises determining all of the different encodings or container files containing streams associated with the content file and then filtering the different encodings based upon one or more predetermined criterion and/or capabilities of a device.

5. The method of claim 4, wherein the different encodings are filtered based upon predetermined criteria comprising device capabilities of different devices, and/or information associated with a user account.

6. The method of claim 2, wherein the different top level index files, each index file for a different device with whom the content file is shared, are generated in response to a request from a first playback device to share content file with the one or more different devices, and further comprising providing the one or more different devices with cryptographic information enabling playback of the content file.

7. The method of claim 1, wherein the different top level index files comprises a top level index file provided to a device capable of playing back a 4K encoded stream, and wherein the top level index file provided to the device includes information about both an available H.265 High Efficiency Video Coding (HEVC) encoding and an available H.264 encoding of the content file.

8. The method of claim 1, wherein the different top level index files comprises a top level index file provided to a device that is not capable of playing back a 4K H.265 High Efficiency Video Coding (HEVC) stream, and wherein the top level index file provided to the device includes only information for obtaining an HD H.264 encoding of the content file.

9. The method of claim 1, wherein the one or more capabilities of each of the one or more different devices comprise encoding/decoding capabilities, resolution, and/or network bandwidth.

10. The method of claim 1, wherein the first playback device is a mobile device using an application, the application configured to capture video content and configured to stream video content to a transcoding server capable of transcoding the video content into different encodings for adaptive bitrate streaming.

11. The method of claim 1, wherein the wherein the first playback device is a mobile device using an application, the application configured to capture video content and configured to stream video content to a transcoding server capable of transcoding the video content into different encodings for real time adaptive bitrate streaming.

12. The method of claim 1, wherein transcoding the content file into one or more different encodings is performed in real time.

13. A method for transcoding a content file into one or more different encodings and generating, based on a device's capabilities, a top level index file of the one or more different encodings for use in playback of the content file, the method comprising:

receiving the content file for sharing with one or more different devices, the content file received from a first playback device, the content file comprising an encoded video file captured by the first playback device and encoded using a first particular encoding format;

wherein the first playback device is a mobile device using an application, the application configured to capture video content and configured to stream video content to a transcoding server capable of transcoding the video content into different encodings for adaptive bitrate streaming;

determining one or more capabilities of the one or more different devices to which the content file is to be shared;

transcoding the content file into one or more different encodings based on the one or more capabilities of the one or more different devices to which the content file is to be shared;

generating different top level index files for the one or more capabilities of the one or more different devices to which the content file is to be shared, where:

each top level index file describes a location and content of container files, the container files containing different encodings of media configured to be utilized to stream and playback content; and each top level index file references different encodings of the content file that a corresponding device is configured to switch between during adaptive streaming; and providing one or more encodings of the content file to the one or more different devices using the top level index files.

14. The method of claim 13, wherein the different top level index files are generated in response to requests from the one or more different devices for the content file.

15. The method of claim 14, wherein the requests comprise a product identifier that is used to determine one or more capabilities of the one or more different devices.

16. The method of claim 14, wherein generating the different top level index files comprises determining all of the different encodings or container files containing streams associated with the content file and then filtering the different encodings based upon one or more predetermined criterion and/or capabilities of a device.

17. The method of claim 16, wherein the different encodings are filtered based upon predetermined criteria comprising device capabilities of different devices, and/or information associated with a user account.

18. The method of claim 14, wherein the different top level index files, each index file for a different device with whom the content file is shared, are generated in response to a request from a first playback device to share content file with the one or more different devices, and further comprising providing the one or more different devices with cryptographic information enabling playback of the content file.

19. The method of claim 13, wherein the different top level index files comprises a top level index file provided to a device capable of playing back a 4K encoded stream, and wherein the top level index file provided to the device includes information about both an available H.265 High Efficiency Video Coding (HEVC) encoding and an available H.264 encoding of the content file.

20. The method of claim 13, wherein the different top level index files comprises a top level index file provided to a device that is not capable of playing back a 4K H.265 High Efficiency Video Coding (HEVC) stream, and wherein the top level index file provided to the device includes only information for obtaining an HD H.264 encoding of the content file.

21. The method of claim 13, wherein the one or more capabilities of each of the one or more different devices comprise encoding/decoding capabilities, resolution, and/or network bandwidth.

22. The method of claim 13, wherein transcoding the content file into one or more different encodings is performed in real time.

23. A method for transcoding a content file into one or more different encodings and generating, based on a device's capabilities, a top level index file of the one or more different encodings for use in playback of the content file, the method comprising:

receiving the content file for sharing with one or more different devices, the content file received from a first playback device, the content file comprising an encoded video file captured by the first playback device and encoded using a first particular encoding format; wherein the first playback device is a mobile device using an application, the application configured to capture video content and configured to stream video content to a transcoding server capable of transcoding the video content into different encodings for real time adaptive bitrate streaming;

determining one or more capabilities of the one or more different devices to which the content file is to be shared;

transcoding the content file into one or more different encodings in real time based on the one or more capabilities of the one or more different devices to which the content file is to be shared;

generating different top level index files for the one or more capabilities of the one or more different devices to which the content file is to be shared, where:

each top level index file describes a location and content of container files, the container files containing different encodings of media configured to be utilized to stream and playback content; and each top level index file references different encodings of the content file that a corresponding device is configured to switch between during adaptive streaming; and providing one or more encodings of the content file to the one or more different devices using the top level index files.

24. The method of claim 23, wherein the different top level index files are generated in response to requests from the one or more different devices for the content file.

25. The method of claim 24, wherein the requests comprise a product identifier that is used to determine one or more capabilities of the one or more different devices.

26. The method of claim 24, wherein generating the different top level index files comprises determining all of the different encodings or container files containing streams associated with the content file and then filtering the different encodings based upon one or more predetermined criterion and/or capabilities of a device.

27. The method of claim 26, wherein the different encodings are filtered based upon predetermined criteria comprising device capabilities of different devices, and/or information associated with a user account.

28. The method of claim 24, wherein the different top level index files, each index file for a different device with whom the content file is shared, are generated in response to a request from a first playback device to share content file with the one or more different devices, and further comprising providing the one or more different devices with cryptographic information enabling playback of the content file.

29. The method of claim 23, wherein the different top level index files comprises a top level index file provided to a device capable of playing back a 4K encoded stream, and wherein the top level index file provided to the device includes information about both an available H.265 High Efficiency Video Coding (HEVC) encoding and an available H.264 encoding of the content file.

30. The method of claim 23, wherein the different top level index files comprises a top level index file provided to a device that is not capable of playing back a 4K H.265 High Efficiency Video Coding (HEVC) stream, and wherein the top level index file provided to the device includes only information for obtaining an HD H.264 encoding of the content file.

31. The method of claim 23, wherein the one or more capabilities of each of the one or more different devices comprise encoding/decoding capabilities, resolution, and/or network bandwidth.

* * * * *